United States Patent
Gädt et al.

(10) Patent No.: US 9,315,419 B2
(45) Date of Patent: Apr. 19, 2016

(54) ADDITIVE FOR HYDRAULICALLY SETTING COMPOSITIONS

(71) Applicant: Construction Research & Technology, GmbH, Trostberg (DE)

(72) Inventors: Torben Gädt, Traunstein (DE); Harald Grassl, Feichten (DE); Alexander Kraus, Pittenhart (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/414,794

(22) PCT Filed: Jul. 19, 2013

(86) PCT No.: PCT/EP2013/065353
§ 371 (c)(1),
(2) Date: Jan. 14, 2015

(87) PCT Pub. No.: WO2014/013077
PCT Pub. Date: Jan. 23, 2014

(65) Prior Publication Data
US 2015/0158768 A1    Jun. 11, 2015

Related U.S. Application Data

(60) Provisional application No. 61/673,853, filed on Jul. 20, 2012.

(30) Foreign Application Priority Data

Jul. 20, 2012 (EP) ..................................... 12177399

(51) Int. Cl.
C04B 24/26    (2006.01)
C04B 28/02    (2006.01)
C04B 103/30   (2006.01)

(52) U.S. Cl.
CPC ........... *C04B 24/267* (2013.01); *C04B 24/2629* (2013.01); *C04B 24/2647* (2013.01); *C04B 24/2658* (2013.01); *C04B 28/02* (2013.01); *C04B 2103/308* (2013.01)

(58) Field of Classification Search
CPC ........................ C04B 24/267; C04B 2103/308
See application file for complete search history.

(56) References Cited

U.S. PATENT DOCUMENTS

| | | | |
|---|---|---|---|
| 6,762,220 | B1 | 7/2004 | Yaguchi et al. |
| 7,879,146 | B2 * | 2/2011 | Raki ....................... C04B 22/06 106/802 |
| 2002/0007019 | A1 | 1/2002 | Schober et al. |
| 2004/0127607 | A1 | 7/2004 | Schober et al. |
| 2007/0022916 | A1 | 2/2007 | Raki et al. |
| 2007/0032599 | A1 | 2/2007 | Schober et al. |
| 2011/0083586 | A1 | 4/2011 | Raki et al. |
| 2011/0166261 | A1 | 7/2011 | Lorenz et al. |
| 2012/0046393 | A1 | 2/2012 | Cha et al. |

FOREIGN PATENT DOCUMENTS

| | | |
|---|---|---|
| EP | 1 136 508 A1 * | 9/2001 |
| EP | 2 412 689 A2 * | 2/2012 |
| WO | WO 00/48961 A1 | 8/2000 |
| WO | WO 2009/004348 A2 * | 1/2009 |
| WO | WO 2010/029117 A2 | 3/2010 |

OTHER PUBLICATIONS

PCT/EP2013/065353—International Search Report, Aug. 14, 2013.
PCT/EP2013/065353—International Written Opinion, Aug. 14, 2013.
PCT/EP2013/065353—International Preliminary Report on Patentability, Jan. 20, 2015.

* cited by examiner

*Primary Examiner* — Robert Harlan
(74) *Attorney, Agent, or Firm* — Curatolo Sidoti Co., LPA; Joseph G. Curatolo; Salvatore A. Sidoti

(57) ABSTRACT

The present invention relates to an additive for hydraulically setting compositions, comprising an aqueous, colloidally disperse preparation of at least one salt of a polyvalent metal cation and of at least one polymeric dispersant which comprises anionic and/or anionogenic groups and polyether side chains. The additive is suitable particularly as a slump retainer.

17 Claims, No Drawings

ADDITIVE FOR HYDRAULICALLY SETTING COMPOSITIONS

CROSS REFERENCE TO RELATED APPLICATIONS

This application is a national stage application of International Application No. PCT/EP2013/065353, filed 19 Jul. 2013, which claims priority from European Patent Application No. 12177399.8 and U.S. Provisional Patent Application Ser. No. 61/673,853, both filed 20 Jul. 2012, from which applications priority is claimed, and which are incorporated herein by reference.

The invention relates to an additive for hydraulically setting compositions which is suitable particularly as a slump retainer.

Hydraulically setting compositions comprising aqueous slurries of hydraulic and/or mineral binder with pulverulent organic and/or inorganic substances, such as clays, finely ground silicates, chalks, carbon blacks, or finely ground minerals, find broad application in the form, for example, of concretes, mortars or plasters.

It is known that hydraulically setting compositions are admixed, for the purpose of improving their processing properties—that is, kneadability, spreadability, sprayability, pumpability or fluidity—with additives which comprise polymeric dispersants. Additives of this kind are able to prevent the formation of agglomerates of solids, to disperse existing particles and those newly formed by hydration, and in this way to improve the processing properties. Additives which comprise polymeric dispersants are also particularly used specifically in the preparation of hydraulically setting compositions which comprise hydraulic and/or mineral binders such as (Portland) cement, slag sand, flyash, silica dust, metakaolin, natural pozzolans, burnt oil shale, calcium aluminate cement, lime, gypsum, hemihydrate, anhydrite or mixtures of two or more of these components.

In order to bring these hydraulically setting compositions, based on the stated binders, into a ready-to-use, processable form, it is generally necessary to use substantially more mixing water than is necessary for the subsequent hardening process. In the concrete structure, the cavities that are formed by the excess water, which subsequently evaporates, reduce the mechanical strength and resistance.

In order to reduce the fraction of excess water for a given processing consistency, and/or to improve the processing properties for a given water/binder ratio, additives are used which are identified generally as water reducers or plasticizers. Water reducers or plasticizers used in practice are more particularly polymers which are obtained by radical polymerization and are based on carboxyl-containing monomers and on polyethylene glycol-containing olefinic monomers, these polymers also being referred to as polycarboxylate ethers (abbreviated to "PCEs"). These polymers have a carboxyl-containing main chain with polyethylene glycol-containing side chains, and are also identified as comb polymers.

Divided off from the water reducers and plasticizers, which produce plasticization of freshly prepared concrete when added in relatively low amounts, are the consistency agents or slump-maintaining additives, referred to below as slump retainers, which achieve the same initial plasticization, only when added at relatively high levels, but bring about a constant slump flow spread over time. In contrast to the addition of water reducers, the addition of slump retainers allows good processing properties to be extended for up to, for example, 90 minutes after the mixing of the concrete, whereas with water reducers the processing properties deteriorate significantly after usually just 10 to 30 minutes.

A characteristic of the comb polymers known to date in the prior art is that depending on certain polymer-specific parameters it is possible deliberately to produce a water reducer or else a slump retainer. These polymer-specific parameters include the number of carboxyl groups or other acid groups, the number and length of the polyethylene glycol side chains, and the molecular weight. An adjustment between water reduction effect and slump retention effect through a corresponding selection of aforementioned polymer-specific parameters is nevertheless possible only a priori by means of synthetic or polymerization measures in the laboratory or in a chemical production plant. In these cases, corresponding types of acid monomers and polyethylene glycol-containing macromonomers are usually selected and polymerized in certain molar ratios. As a result of the stipulation made in the production process, the conversion of a water reducer into a slump retainer, or vice versa, at the site of the concrete processing is not possible according to the prior art.

In the art, generally speaking, water reducers and slump retainers are used in varying proportions in formulations. By means of formulating measures, however, the possibilities of improving slump retention are only very limited, it being difficult in particular to improve slump retention without at the same time adversely affecting other properties of the concrete. For instance, a formulation with slump retainers does result in better slump retention, as disclosed for example in WO 2009/004348 in connection with phosphonates and in JP 57067057A in connection with sugars. However, the retention of the slump is bought only at the expense of poorer early strengths.

Other methods for retaining slump in a cementitious binder dispersion have been disclosed in the prior art over time:

The use of high-performance plasticizers based on polycarboxylate ether with hydrolysable acrylic esters, known as "dynamic superplasticizers", as described in EP 1 136 508 A1 and WO 2010/029117. This technology allows the time-controlled adsorption of plasticizer polymers on to the surfaces of the cement particles, the retention of the slump being improved by hydrolysis of corresponding carboxylic acid derivatives (e.g. acrylic esters) in the alkaline medium represented by the concrete. The "dynamic superplasticizer" properties as well are laid down by synthetic or polymerizational measures within the laboratory or in a chemical production plant, and cannot be adjusted flexibly at the site of the concrete processing.

Furthermore, use is made of crosslinked polycarboxylate ethers which are crosslinked by monomers having more than one polymerizable function, such as di(meth)acrylates, for example. Under the strongly basic conditions of the cementitious pore water, the crosslinking structural units undergo hydrolysis, crosslinking is halted, and the non-crosslinked (co)polymer, which is active as a plasticizer, is released over time (WO2000/048961). The properties of these crosslinked polycarboxylate ethers as well are laid down by synthetic or polymerizational measures in the laboratory or in a chemical production plant, and cannot be adjusted flexibly at the site of the concrete processing. Moreover, the risk exists of an unintended premature hydrolysis during the storage of the products.

U.S. Pat. No. 7,879,146 B2 discloses the preparation of double layer hydroxides based on divalent metal cations (e.g. $Ni^{2+}$, $Zn^{2+}$, $Mn^{2+}$ and/or $Ca^{2+}$) and trivalent metal cations (e.g. $Al^{3+}$, $Ga^{3+}$, $Fe^{3+}$ and/or $Cr^{3+}$). The double layer hydroxides are able to intercalate anions such as nitrates, hydroxides, carbonates, sulphates and chlorides. The inorganic products are treated at elevated temperature (65° C.) for a number of hours and then dried under reduced pressure at 100° C. In a subsequent ion exchange operation, organic molecules are intercalated into the thus-prepared double layer hydroxides, examples of such molecules being naphthalenesulphonates, derivatives of nitrobenzoic acid, salicylic acid, citric acid, polyacrylic acids, polyvinyl alcohol and a superplasticizer based on a sodium salt of polynaphthalenesulphonic acid (PNS). The polynaphthalenesulphonic acid (PNS) sodium salts modified inorganically by double layer hydroxides produce only a slightly improved slump retention in a mortar test. For many applications, this improvement is not sufficient.

EP 2 412 689 describes a nano-hybrid additive for concrete, comprising a layered double hydroxide and a polyurethane copolymer, the additive being prepared by mixing the two components and by hydrothermal treatment. The additive is said to prevent the breakdown of underwater concrete induced by chloride ions and to prevent the decomposition of concrete as a result of the use of deicing agents, such as calcium chloride, in winter. Disadvantageous are the long synthesis times of >6 h and the required high temperatures of 80 to 100° C. for the hydrothermal preparation of the double layer hydroxides. Furthermore, with this method as well, the properties of the hybrid are necessarily laid down in a complicated synthesis procedure in a chemical production plant.

The diverse requirements imposed on the performance profile of concretes are subject to nationally specific regulations and standardizations, and are heavily dependent on the conditions prevailing at the particular building site, such as the weathering conditions, for instance. Slump retention in particular is heavily dependent on the conditions prevailing at the respective construction site.

Since the weathering conditions prevailing from one construction site to another may be very different, there is a need within the construction industry to eliminate the above-described deficiencies of the prior art. The invention is therefore based on the object of providing efficient slump retainers. These slump retainers ought to be able to ensure sufficient slump retention under the conditions prevailing on the construction site, without adversely affecting other concrete properties, such as the early strength, for example.

In accordance with a first embodiment, this object is achieved by an:

1. Additive for hydraulically setting compositions, comprising an aqueous, colloidally disperse preparation of at least one salt of at least one polyvalent metal cation and of at least one polymeric dispersant which comprises anionic and/or anionogenic groups and polyether side chains, where the polyvalent metal cation is selected from
$Al^{3+}$, $Fe^{3+}$, $Fe^{2+}$, $Zn^{2+}$, $Mn^{2+}$, $Cu^{2+}$, $Ca^{2+}$, $Mg^{2+}$, $Sr^{2+}$, $Ba^{2+}$ and mixtures thereof,
preferably selected from
$Al^{3+}$, $Fe^{3+}$, $Fe^{2+}$, $Mn^{2+}$, $Zn^{2+}$, $Ca^{2+}$ and mixtures thereof,
more preferably selected from
$Al^{3+}$, $Fe^{3+}$, $Fe^{2+}$, $Ca^{2+}$ and mixtures thereof, and
more particularly selected from $Al^{3+}$, $Fe^{3+}$, $Fe^{2+}$ and mixtures thereof,
and the polyvalent metal cation is present in a superstoichiometric quantity, calculated as cation equivalents, based on the sum of the anionic and anionogenic groups of the polymeric dispersant.

2. Additive according to embodiment 1, where the polyvalent metal cation is selected from $Al^{3+}$, $Fe^{3+}$, $Fe^{2+}$, $Mn^{2+}$, $Zn^{2+}$, $Ca^{2+}$ and mixtures thereof.

3. Additive according to embodiment 1, where the polyvalent metal cation is selected from $Al^{3+}$, $Fe^{3+}$, $Fe^{2+}$, $Ca^{2+}$ and mixtures thereof.

4. Additive according to embodiment 1, where the polyvalent metal cation is selected from $Al^{3+}$, $Fe^{3+}$, $Fe^{2+}$ and mixtures thereof.

5. Additive according to any of the preceding embodiments, comprising at least one anion which is able to form a low-solubility salt with the polyvalent metal cation.

6. Additive according to any of the preceding embodiments, where the metal cation is present in a quantity corresponding to the following formula (a):

$$1 < \frac{\sum_i z_{K,i} * n_{K,i}}{\sum_j z_{S,j} * n_{S,j}} < 30 \qquad (a)$$

where $z_{K,i}$ is the amount of the charge number of the polyvalent metal cation, $n_{K,i}$ is the number of mols of the weighed-in polyvalent metal cation, $z_{S,j}$ is the amount of the charge number of the anionic and anionogenic groups present in the polymeric dispersant, $n_{S,j}$ is the number of mols of the anionic and anionogenic groups present in the weighed-in polymeric dispersant, the indices i and j are independent of one another and are an integer greater than 0, where i is the number of different kinds of polyvalent metal cations and j is the number of different kinds of anionic and anionogenic groups present in the polymeric dispersant, where z is defined such that the charge number for cations is always based on the full formal charge, i.e. $z_{Fe}(FeCl_3)=3$, $z_{Fe}(FeCl_2)=2$. z stands for the amount of the formal charge of anions on maximum deprotonation, i.e. $z_{PO4}(H_3PO_4)=z_{PO4}(Na_3PO_4)=3$, or $z_{CO3}(Na_2CO_3)=2$. In the case of aluminate, $z_{AlO2}(NaAlO_2)=z_{AlO2}(NaAl(OH)_4)=1$; in the case of silicate, $z_{SiO3}(Na_2SiO_3)=2$ for all silicate species.

7. Additive according to embodiment 6, where the ratio according to formula (a) is in the range from >1 to 30, preferably 1.01 to 10.

8. Additive according to embodiment 6 or 7, where the ratio according to formula (a) is in the range from 1.01 to 8 or 1.1 to 8, preferably 1.01 to 6 or 1.1 to 6 or 1.2 to 6

9. Additive according to any of embodiments 6 to 8, where the ratio according to formula (a) is in the range from 1.01 to 5 or 1.1 to 5 or 1.2 to 5 or 1.25 to 5.

10. Additive according to any of embodiments 5 to 9, where the polyvalent metal cation is present in an amount corresponding to the following formula (a) and the anion is present in an amount corresponding to the following formula (b):

$$1 < \frac{\sum_i z_{K,i} * n_{K,i}}{\sum_j z_{S,j} * n_{S,j}} < 30 \qquad (a)$$

$$0 \leq \frac{\sum_l z_{A,l} * n_{A,l}}{\sum_i z_{K,i} * n_{K,i}} < 3 \qquad (b)$$

where $z_{K,i}$ is the amount of the charge number of the polyvalent metal cation, $n_{K,i}$ is the number of mols of the weighed-in polyvalent metal cation, $z_{S,j}$ is the charge number of the anionic and anionogenic groups present in the polymeric dispersant, $n_{S,j}$ is the number of mols of the anionic and anionogenic groups present in the weighed-in polymeric dispersant, $z_{A,l}$ is the charge number of the weighed-in anion, $n_{A,l}$ is the number of mols of the weighed-in anion, the indices i, j and l are independent of one another and are an integer greater than 0, i is the number of different kinds of polyvalent metal cations and j is the number of different kinds of anionic and anionogenic groups present in the polymeric dispersant, and l is the number of different kinds of anions which are able to form a low-solubility salt with the metal cation.

11. Additive according to embodiment 10, where the ratio according to (b) is in the range from 0 to 3, preferably 0.1 to 2, most preferably 0.2 to 1.5.

12. Additive according to any of embodiments 5 to 11, where the anion is selected from carbonate, oxalate, silicate, phosphate, polyphosphate, phosphite, borate, aluminate, sulphate and mixtures thereof.

13. Additive according to embodiment 12, where the anion is selected from carbonate, silicate, phosphate, aluminate and mixtures thereof.

14. Additive according to embodiment 13, where the anion is phosphate.

15. Additive according to embodiment 10, where the anion is phosphate and the ratio according to formula (b) is in the range from 0.2 to 1.

16. Additive according to embodiment 10, where the anion is aluminate or carbonate and the ratio according to formula (b) is in the range from 0.2 to 2.

17. Additive according to embodiment 10, where the anion is silicate and the ratio according to formula (b) is in the range from 0.2 to 2.

18. Additive according to any of embodiments 5 to 17, where the additive comprises substantially no preparation of an $Al^{3+}$, $Ca^{2+}$ or $Mg^{2+}$ salt and of a silicate.

19. Additive according to any of the preceding embodiments, further comprising at least one neutralizing agent.

20. Additive according to embodiment 19, where the neutralizing agent is an organic aliphatic monoamine, aliphatic polyamine, alkali metal hydroxide, in particular sodium hydroxide or potassium hydroxide, or ammonia.

21. Additive according to embodiment 20, where the neutralizing agent is selected from ammonia, mono-hydroxy-$C_1$-$C_4$ alkylamines, di-hydroxy-$C_1$-$C_4$ alkylamines, tri-hydroxy-$C_1$-$C_4$ alkylamines, mono-$C_1$-$C_4$ alkylamines, di-$C_1$-$C_4$ alkylamines, tri-$C_1$-$C_4$ alkylamines, $C_1$-$C_4$ alkylenediamines, (tetra-hydroxy-$C_1$-$C_4$ alkyl)-$C_1$-$C_4$ alkylenediamines, polyethylenimines, polypropylenimines and mixtures thereof.

22. Additive according to embodiment 21, where the neutralizing agent is selected from ammonia, mono-hydroxy-$C_1$-$C_4$ alkylamines, di-hydroxy-$C_1$-$C_4$ alkylamines, tri-hydroxy-$C_1$-$C_4$ alkylamines, $C_1$-$C_4$ alkylenediamines, and polyethylenimines.

23. Additive according to embodiment 22, where the neutralizing agent is selected from ammonia, ethylenediamine, monoethanolamine, diethanolamine, triethanolamine and polyethylenimines.

24. Additive according to any of the preceding embodiments, having a pH of 2 to 11.5, preferably 5 to 9 and more particularly 6 to 8.

25. Additive according to any of the preceding embodiments, where the polymeric dispersant comprises as anionic or anionogenic group at least one structural unit of the general formulae (Ia), (Ib), (Ic) and/or (Id):

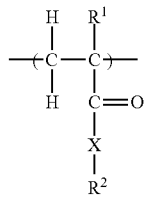
(Ia)

in which $R^1$ is H or an unbranched or branched $C_1$-$C_4$ alkyl group, $CH_2COOH$ or $CH_2CO$—X—$R^2$, preferably H or $CH_3$;

X is NH—$(C_nH_{2n})$, $O(C_nH_{2n})$ with n=1, 2, 3 or 4, where the nitrogen atom or the oxygen atom is bonded to the CO group, or is a chemical bond, preferably X is chemical bond or $O(C_nH_{2n})$;

$R^2$ is OM, $PO_3M_2$, or O—$PO_3M_2$, with the proviso that X is a chemical bond if $R^2$ is OM;

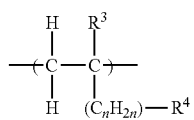
(Ib)

in which $R^3$ is H or an unbranched or branched $C_1$-$C_4$ alkyl group, preferably H or $CH_3$;

n is 0, 1, 2, 3 or 4, preferably 0 or 1;

$R^4$ is $PO_3M_2$, or O—$PO_3M_2$;

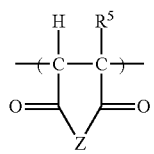
(Ic)

in which $R^5$ is H or an unbranched or branched $C_1$-$C_4$ alkyl group, preferably H;

Z is O or $NR^7$, preferably O;

$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and n is 1, 2, 3 or 4, preferably 1, 2 or 3;

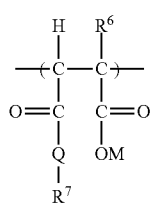
(Id)

in which $R^6$ is H or an unbranched or branched $C_1$-$C_4$ alkyl group, preferably H;

Q is $NR^7$ or O, preferably O;

$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, n is 1, 2, 3 or 4, preferably 1, 2 or 3; and each M independently of any other is H or a cation equivalent.

26. Additive according to embodiment 25, where the polymeric dispersant comprises as anionic or anionogenic group at least one structural unit of the formula (Ia) in which $R^1$ is H or $CH_3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

27. Additive according to embodiment 25, where the polymeric dispersant comprises as anionic or anionogenic group at least one structural unit of the formula (Ia) in which $R^1$ is H or $CH_3$ and $XR^2$ is OM or X is $O(C_nH_{2n})$ with n=1, 2, 3 or 4, more particularly 2, and $R^2$ is $O-PO_3M_2$.

28. Additive according to any of the preceding embodiments, where the polymeric dispersant comprises as polyether side chain at least one structural unit of the general formulae (IIa), (IIb), (IIc) and/or (IId):

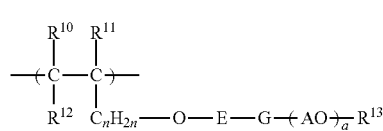

(IIa)

in which $R^{10}$, $R^{11}$ and $R^{12}$ independently of one another are H or an unbranched or branched $C_1$-$C_4$ alkyl group;

E is an unbranched or branched $C_1$-$C_6$ alkylene group, a cyclohexylene group, $CH_2$-$C_6H_{10}$, 1,2-phenylene, 1,3-phenylene or 1,4-phenylene;

G is O, NH or CO—NH; or

E and G together are a chemical bond;

A is $C_xH_{2x}$ with x=2, 3, 4 or 5, or is $CH_2CH(C_6H_5)$, preferably 2 or 3;

n is 0, 1, 2, 3, 4 or 5, preferably 0, 1 or 2;

a is an integer from 2 to 350, preferably 5 to 150;

$R^{13}$ is H, an unbranched or branched $C_1$-$C_4$ alkyl group, $CO-NH_2$ and/or $COCH_3$;

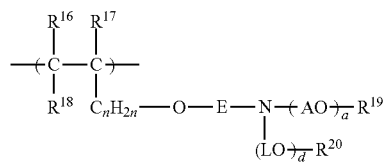

(IIb)

in which $R^{16}$, $R^{17}$ and $R^{18}$ independently of one another are H or an unbranched or branched $C_1$-$C_4$ alkyl group;

E is an unbranched or branched $C_1$-$C_6$ alkylene group, a cyclohexylene group, $CH_2$-$C_6H_{10}$, 1,2-phenylene, 1,3-phenylene, or 1,4-phenylene, or is a chemical bond;

A is $C_xH_{2x}$, with x=2, 3, 4 or 5, or is $CH_2CH(C_6H_5)$, preferably 2 or 3;

n is 0, 1, 2, 3, 4 and/or 5, preferably 0, 1 or 2;

L is $C_xH_{2x}$, with x=2, 3, 4 or 5, or is $CH_2-CH(C_6H_5)$, preferably 2 or 3;

a is an integer from 2 to 350, preferably 5 to 150;

d is an integer from 1 to 350, preferably 5 to 150;

$R^{19}$ is H or an unbranched or branched $C_1$-$C_4$ alkyl group;

$R^{20}$ is H or an unbranched $C_1$-$C_4$ alkyl group;

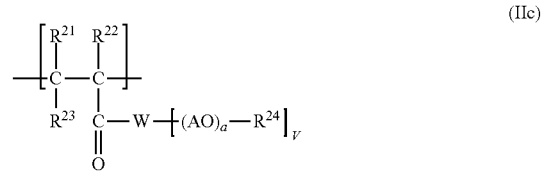

(IIc)

in which $R^{21}$, $R^{22}$ and $R^{23}$ independently of one another are H or an unbranched or branched $C_1$-$C_4$ alkyl group;

W is O, $NR^{25}$, or is N;

V is 1 if W=O or $NR^{25}$, and is 2 if W=N;

A is $C_xH_{2x}$ with x=2, 3, 4 or 5, or is $CH_2CH(C_6H_5)$, preferably 2 or 3;

a is an integer from 2 to 350, preferably 5 to 150;

$R^{24}$ is H or an unbranched or branched $C_1$-$C_4$ alkyl group; and $R^{25}$ is H or an unbranched or branched $C_1$-$C_4$ alkyl group;

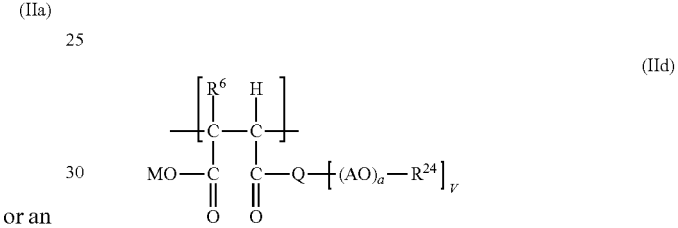

(IId)

in which $R^6$ is H or an unbranched or branched $C_1$-$C_4$ alkyl group;

Q is $NR^{10}$, N or O;

V is 1 if W=O or $NR^{10}$ and is 2 if W=N;

$R^{10}$ is H or an unbranched or branched $C_1$-$C_4$ alkyl group; and

A is $C_xH_{2x}$, with x=2, 3, 4 or 5, or is $CH_2C(C_6H_5)H$, preferably 2 or 3; and a is an integer from 2 to 350, preferably 5 to 150.

29. Additive according to embodiment 28, where the polymeric dispersant comprises as polyether side chain:

(a) at least one structural unit of the formula (IIa) in which $R^{10}$ and $R^{12}$ are H, $R^{11}$ is H or $CH_3$, E and G together are a chemical bond, A is $C_xH_{2x}$ with x=2 and/or 3, a is 3 to 150, and $R^{13}$ is H or an unbranched or branched $C_1$-$C_4$ alkyl group; and/or (b) at least one structural unit of the formula (IIb) in which $R^{16}$ and $R^{18}$ are H, $R^{17}$ is H or $CH_3$, E is an unbranched or branched $C_1$-$C_6$ alkylene group, A is $C_xH_{2x}$ with x=2 and/or 3, L is $C_xH_{2x}$ with x=2 and/or 3, a is an integer from 2 to 150, d is an integer from 1 to 150, $R^{19}$ is H or an unbranched or branched $C_1$-$C_4$ alkyl group, and $R^{20}$ is H or an unbranched or branched $C_1$-$C_4$ alkyl group; and/or (c) at least one structural unit of the formula (IIc) in which $R^{21}$ and $R^{23}$ are H, $R^{22}$ is H or $CH_3$, A is $C_xH_{2x}$ with x=2 and/or 3, a is an integer from 2 to 150, and $R^{24}$ is H or an unbranched or branched $C_1$-$C_4$ alkyl group; and/or (d) at least one structural unit of the formula (IId) in which $R^6$ is H, Q is O, $R^7$ is $(C_nH_{2n})-O-(AO)_a-R^9$, n is 2 and/or 3, A is $C_xH_{2x}$ with x=2 and/or 3, a is an integer from 1 to 150 and $R^9$ is H or an unbranched or branched $C_1$-$C_4$ alkyl group.

30. Additive according to one of the embodiments 28 or 29, where the polymeric dispersant comprises at least one structural unit of the formula (IIa) and/or (IIc).

31. Additive according to any of embodiments 1 to 24, where the polymeric dispersant is a polycondensation product which comprises structural units (III) and (IV):

(III)

in which

T is a substituted or unsubstituted phenyl or naphthyl radical or a substituted or unsubstituted heteroaromatic radical having 5 to 10 ring atoms, of which 1 or 2 atoms are heteroatoms selected from N, O and S;

n is 1 or 2;

B is N, NH or O, with the proviso that n is 2 if B is N and with the proviso that n is 1 if B is NH or O;

A is $C_xH_{2x}$ with x=2, 3, 4 or 5, or is $CH_2CH(C_6H_5)$;

a is an integer from 1 to 300, preferably 5 to 150;

$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;

where the structural unit (IV) is selected from the structural units (IVa) and (IVb)

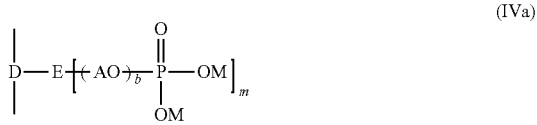

(IVa)

in which

D is a substituted or unsubstituted phenyl or naphthyl radical or a substituted or unsubstituted heteroaromatic radical having 5 to 10 ring atoms, of which 1 or 2 atoms are heteroatoms selected from N, O and S;

E is N, NH or O, with the proviso that m is 2 if E is N and with the proviso that m is 1 if E is NH or O;

A is $C_xH_{2x}$ with x=2, 3, 4 or 5, or is $CH_2CH(C_6H_5)$;

b is an integer from 1 to 300, preferably 1 to 50;

M independently at each occurrence is H, a cation equivalent; and

(IVb)

in which

V is a substituted or unsubstituted phenyl or naphthyl radical and is optionally substituted by 1 or two radicals selected independently of one another from $R^8$, OH, $OR^8$, $(CO)R^8$, COOM, $COOR^8$, $SO_3R^8$ and $NO_2$, preferably OH, $OC_1$-$C_4$ alkyl and $C_1$-$C_4$ alkyl;

$R^7$ is COOM, $OCH_2COOM$, $SO_3M$ or $OPO_3M_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl.

32. Additive according to embodiment 31, where T is a substituted or unsubstituted phenyl radical or naphthyl radical, E is NH or O, A is $C_xH_{2x}$ with x=2 and/or 3, a is an integer from 1 to 150, and $R^{25}$ is H, or a branched or unbranched $C_1$ to $C_{10}$ alkyl radical.

33. Additive according to embodiment 31, where D is a substituted or unsubstituted phenyl radical or naphthyl radical, E is NH or O, A is $C_xH_{2x}$ with x=2 and/or 3, and b is an integer from 1 to 150.

34. Additive according to any of embodiments 31 to 33, where T and/or D are phenyl or naphthyl which is substituted by 1 or 2 $C_1$-$C_4$ alkyl, hydroxyl or 2 $C_1$-$C_4$ alkoxy groups.

35. Additive according to embodiment 31, where V is phenyl or naphthyl which is substituted by 1 or 2 $C_1$-$C_4$ alkyl, OH, $OCH_3$ or COOM, and $R^7$ is COOM or $OCH_2COOM$.

36. Additive according to any of embodiments 31 to 35, where the polycondensation product comprises a further structural unit (V) of the formula

(V)

in which $R^5$ and $R^6$ may be identical or different and are H, $CH_3$, COOH or a substituted or unsubstituted phenyl or naphthyl group or are a substituted or unsubstituted heteroaromatic group having 5 to 10 ring atoms, of which 1 or 2 atoms are heteroatoms selected from N, O and S.

37. Additive according to embodiment 36, in which $R^5$ and $R^6$ may be identical or different and are H, $CH_3$, or COOH, more particularly H, or one of the radicals $R^5$ and $R^6$ is H and the other is $CH_3$.

38. Additive according to any of embodiments 1 to 30, where the polymeric dispersant comprises units of the formulae (I) and (II), more particularly of the formulae (Ia) and (IIa).

39. Additive according to any of embodiments 1 to 30, where the polymeric dispersant comprises structural units of the formulae (Ia) and (IIc).

40. Additive according to any of embodiments 1 to 30, where the polymeric dispersant comprises structural units of the formulae (Ic) and (IIa).

41. Additive according to any of embodiments 1 to 30, where the polymeric dispersant comprises structural units of the formulae (Ia), (Ic) and (IIa).

42. Additive according to any of embodiments 1 to 30, where the polymeric dispersant is constructed from (i) anionic or anionogenic structural units derived from acrylic acid, methacrylic acid, maleic acid, hydroxyethyl acrylate phosphoric acid ester, and/or hydroxyethyl methacrylate phosphoric acid ester, hydroxyethyl acrylate phosphoric acid diester, and/or hydroxyethyl methacrylate phosphoric acid diester, and (ii) polyether side chain structural units derived from $C_1$-$C_4$ alkyl-polyethylene glycol acrylic acid ester, polyethylene glycol acrylic acid ester, $C_1$-$C_4$ alkyl-polyethylene glycol methacrylic acid ester, polyethylene glycol methacrylic acid ester, $C_1$-$C_4$ alkyl-polyethylene glycol acrylic acid ester, polyethylene glycol acrylic acid ester, vinyloxy-$C_2$-$C_4$ alkylene-polyethylene glycol, vinyloxy-$C_2$-$C_4$ alkylene-polyethylene glycol $C_1$-$C_4$ alkyl ether, allyloxypolyethylene glycol, allyloxypolyethylene glycol $C_1$-$C_4$ alkyl ether, methallyloxy-polyethylene glycol, methallyloxy-polyethylene glycol $C_1$-$C_4$ alkyl ether, isoprenyloxy-polyethylene glycol and/or isoprenyloxy-polyethylene glycol $C_1$-$C_4$ alkyl ether.

43. Additive according to embodiment 42, where the polymeric dispersant is constructed from structural units (i) and (ii) derived from (i) hydroxyethyl acrylate phosphoric acid ester and/or hydroxyethyl methacrylate phosphoric acid ester and (ii) $C_1$-$C_4$ alkyl-polyethylene glycol acrylic acid ester and/or $C_1$-$C_4$ alkyl-polyethylene glycol methacrylic acid ester; or (i) acrylic acid and/or methacrylic acid and (ii) $C_1$-$C_4$ alkyl-polyethylene glycol acrylic acid ester and/or $C_1$-$C_4$ alkyl-polyethylene glycol methacrylic acid ester; or (i) acrylic acid, methacrylic acid and/or maleic acid and (ii) vinyloxy-$C_2$-$C_4$ alkylene-polyethylene glycol, allyloxy-polyethylene glycol, methallyloxy-polyethylene glycol and/or isoprenyloxy-polyethylene glycol.

44. Additive according to embodiment 42, where the polymeric dispersant is constructed from structural units (i) and (ii) derived from (i) hydroxyethyl methacrylate phosphoric acid ester and (ii) $C_1$-$C_4$ alkyl-polyethylene glycol methacrylic acid ester or polyethylene glycol methacrylic acid ester; or (i) methacrylic acid and (ii) $C_1$-$C_4$ alkyl-polyethylene glycol methacrylic acid ester or polyethylene glycol methacrylic acid ester; or (i) acrylic acid and maleic acid and (ii) vinyloxy-$C_2$-$C_4$ alkylene-polyethylene glycol or (i) acrylic acid and maleic acid and (ii) isoprenyloxy-polyethylene glycol or (i) acrylic acid and (ii) vinyloxy-$C_2$-$C_4$ alkylene-polyethylene glycol or (i) acrylic acid and (ii) isoprenyloxy-polyethylene glycol or (i) acrylic acid and (ii) methallyloxy-polyethylene glycol or (i) maleic acid and (ii) isoprenyloxy-polyethylene glycol or (i) maleic acid and (ii) allyloxy-polyethylene glycol or (i) maleic acid and (ii) methallyloxy-polyethylene glycol.

45. Additive according to any of embodiments 25 to 30, where the molar ratio of the structural units (I):(II) is 1:4 to 15:1, more particularly 1:1 to 10:1.

46. Additive according to any of the preceding embodiments, where the molar weight of the polyether side chains is >2000 g/mol, preferably >4000 g/mol.

47. Additive according to embodiment 46, where the molar weight of polyether side chains is in the range of 2000-8000 g/mol, more particularly 4000-6000 g/mol.

48. Additive according to any of the preceding embodiments, wherein the charge density of the polymeric dispersant is in the range of 0.7-1.5 mmol/g, preferably between 0.8-1.25 mmol/g.

49. Additive according to any of the preceding embodiments, where the molar weight of the polymeric dispersant is in the range from 10 000 g/mol to 80 000 g/mol, preferably 15 000 g/mol to 55 000 g/mol.

50. Additive according to any of embodiments 31 to 37, where the molar ratio of the structural units (III):(IV) is 4:1 to 1:15, more particularly 2:1 to 1:10.

51. Additive according to any of embodiments 31 to 37, where the molar ratio of the structural units (III+IV):(V) is 2:1 to 1:3, more particularly 1:0.8 to 1:2.

52. Additive according to any of embodiments 31 to 37 or 50 to 51, where the polymeric dispersant is constructed from structural units of the formulae (III) and (IV), in which T and D are phenyl or naphthyl, the phenyl or naphthyl being optionally substituted by 1 or 2 $C_1$-$C_4$ alkyl, hydroxyl or 2 $C_1$-$C_4$ alkoxy groups, B and E are O, A is $C_xH_{2x}$ with x=2, a is 3 to 150, more particularly 10 to 150, and b is 1, 2 or 3.

53. Additive according to any of the preceding embodiments, comprising a polymeric dispersant having structural units of the above-stated formulae (Ia) to (Id), (IIa) to (IId) (polycarboxylate ethers and polyphosphate ethers, respectively) or of the formulae (III) and (IV) (polycondensate), a polyvalent metal cation selected from $Al^{3+}$, $Fe^{3+}$, $Fe^{2+}$, $Ca^{2+}$ and mixtures thereof, and an anion selected from phosphate, aluminate, hydroxide and mixtures thereof.

54. Additive according to embodiment 53, where the preparation comprises:
a) polycarboxylate ether+$Ca^{2+}$+phosphate
b) polycarboxylate ether+$Ca^{2+}$+aluminate
c) polycarboxylate ether+$Fe^{3+}$
d) polycarboxylate ether+$Fe^{2+}$
e) polycarboxylate ether+$Al^{3+}$
f) polycarboxylate ether+$Al^{3+}$+phosphate
g) polycarboxylate ether+$Fe^{3+}$+phosphate
h) polycondensate+$Ca^{2+}$+phosphate
i) polycondensate+$Al^{3+}$
j) polycondensate+$Al^{3+}$+phosphate
k) polyphosphate ether+$Ca^{2+}$
l) polyphosphate ether+$Al^{3+}$
m) polyphosphate ether+$Fe^{3+}$ or $Fe^{2+}$
n) polyphosphate ether+$Ca^{2+}$+phosphate.

55. Additive according to any of the preceding embodiments, obtainable by precipitating the salt of the polyvalent metal cation in the presence of the polymeric dispersant, to give a colloidally disperse preparation of the salt.

56. Additive according to any of the preceding embodiments, obtainable by dispersing a freshly precipitated salt of the polyvalent metal cation in the presence of the polymeric dispersant, to give a colloidally disperse preparation of the salt.

57. Additive according to embodiment 55 or 56, where a neutralizing agent is added to the colloidally disperse preparation.

58. Additive according to any of embodiments 1 to 56, obtainable by peptizing a hydroxide and/or oxide of the polyvalent metal cation with an acid, to give a colloidally disperse preparation of the salt of the polyvalent metal cation.

59. Additive according to embodiment 58, where the acid is selected from boric acid, carbonic acid, oxalic acid, silicic acid, sulphuric acid, polyphosphoric acid, phosphoric acid and/or phosphorous acid.

60. Additive according to any of the preceding embodiments, where the ratio according to formula (a) is in the range from 1.01 to 30, preferably 1.01 to 10, more preferably 1.1 to 8, with further preference 1.2 to 6 and more particularly 1.25 to 5.

61. Additive according to embodiment 60, where the ratio according to formula (b) is in the range from 0.01 to 3, preferably 0.1 to 2, more preferably 0.2 to 1.5.

62. Additive according to any of the preceding embodiments, comprising a preparation of an $Al^{3+}$ salt.

63. Additive according to any of embodiments 1 to 61, comprising a preparation of an $Fe^{3+}$ salt.

64. Additive according to any of embodiments 1 to 61 or 63, comprising a preparation of an $Fe^{2+}$ salt.

65. Additive according to any of embodiments 1 to 61, comprising a preparation of a $Ca^{2+}$ salt.

66. Additive according to any of embodiments 5 to 65, where the anion is selected from carbonate, silicate, phosphate and aluminate, more particularly phosphate.

67. Additive according to embodiment 66, where the anion is phosphate and the ratio according to formula (b) is in the range from 0.2 to 1.

68. Additive according to embodiment 66, where the anion is aluminate or carbonate and the ratio according to formula (b) is in the range from 0.2 to 2.

69. Additive according to embodiment 66, where the anion is silicate and the ratio according to formula (b) is in the range from 0.2 to 2.

70. Building material mixture comprising an additive according to any of embodiments 1 to 69 and a binder selected from (Portland) cement, slag sand, flyash, silica dust, metakaolin, natural pozzolans, burnt oil shale, calcium aluminate cement and mixtures thereof.

71. Building material mixture according to embodiment 70, which comprises (Portland) cement as hydraulic binder.

72. Building material mixture according to embodiment 70, which comprises substantially no (0% to 5% by weight) Portland cement.

According to one embodiment, the metal cation is present in a quantity corresponding to the following formula (a):

$$1 < \frac{\sum_i z_{K,i} * n_{K,i}}{\sum_j z_{S,j} * n_{S,j}} < 30 \qquad (a)$$

where $z_{K,i}$ is the amount of the charge number of the polyvalent metal cation, $n_{K,i}$ is the number of mols of the weighed-in polyvalent metal cation, $z_{S,j}$ is the amount of the charge number of the anionic and anionogenic groups present in the polymeric dispersant, $n_{S,j}$ is the number of mols of the anionic and anionogenic groups present in the weighed-in polymeric dispersant, the indices i and j are independent of one another and are an integer greater than 0, where i is the number of different kinds of polyvalent metal cations and j is the number of different kinds of anionic and anionogenic groups present in the polymeric dispersant, where z is defined such that the charge number for cations is always based on the full formal charge, i.e. $z_{Fe}(FeCl_3)=3$, $z_{Fe}(FeCl_2)=2$. Additionally, z stands for the amount of the formal charge of anions on maximum deprotonation, i.e. $z_{PO4}(H_3PO_4)=z_{PO4}(Na_3PO_4)=3$, or $z_{CO3}(Na_2CO_3)=2$. In the case of aluminate, $z_{AlO2}(NaAlO_2)=z_{AlO2}(NaAl(OH)_4)=1$; in the case of silicate, $z_{SiO3}(Na_2SiO_3)=2$ for all silicate species.

The sum of the product of charge number $z_{S,j}$ and number of mols $n_{S,j}$ in mmol/g in the polymeric dispersant can be determined by various known methods, as for example by determination by charge density titration with a polycation as described for example in J. Plank et al., Cem. Concr. Res. 2009, 39, 1-5. Moreover, the skilled person familiar with the state of the art is capable of determining this value in a simple calculation (see calculation for example 41) from the initial weighings of monomers for the synthesis of the polymeric comb polymer. Lastly it is possible to obtain the numerical value of the sum of the product of $z_s$ and $n_s$ experimentally, by determining the ratios of the polymer units by means of nuclear magnetic resonance spectroscopy (NMR). This is done by utilising in particular the integration of the signals in the 1 H-NMR spectrum of a comb polymer.

The polyvalent metal cation is selected from $Al^{3+}$, $Fe^{3+}$, $Fe^{2+}$, $Zn^{2+}$, $Mn^{2+}$, $Cu^{2+}$, $Ca^{2+}$, $Mg^{2+}$, $Sr^{2+}$, $Ba^{2+}$ and mixtures thereof, preferably selected from $Al^{3+}$, $Fe^{3+}$, $Fe^{2+}$, $Mn^{2+}$, $Zn^{2+}$, $Ca^{2+}$ and mixtures thereof, more preferably selected from $Al^{3+}$, $Fe^{3+}$, $Fe^{2+}$, $Ca^{2+}$ and mixtures thereof and in particular selected from $Al^{3+}$, $Fe^{3+}$, $Fe^{2+}$, and mixtures thereof.

The counteranion of the polyvalent metal cation salt used is preferably selected such that the salts are readily water-soluble, the solubility under standard conditions of 20° C. and atmospheric pressure being preferably greater than 10 g/l, more preferably greater than 100 g/l and very particularly greater than 200 g/l. The numerical value of the solubility here relates to the solution equilibrium ($MX=M^{n+}+X^{n-}$, where $M^{n+}$: metal cation; $X^{n-}$: anion) of the pure substance of the salt in deionised water at 20° C. under atmospheric pressure, and takes no account of the effects of protonation equilibriums (pH) and complexation equilibriums.

The anions are preferably sulphate, or a singly charged counteranion, preferably a nitrate, acetate, formate, hydrogensulphate, halide, halate, pseudohalide, methanesulphonate and/or amidosulphonate. Particularly preferred from the series of halogens is chloride. The pseudohalides include cyanide, azide, cyanate, thiocyanate and fulminate. Double salts as well can be used as metal salt. Double salts are salts which have two or more different cations. An example is alum ($KAl(SO_4)_2.12H_2O$) which is suitable as an aluminium salt. The metal cation salts with the aforementioned counteranions are readily water-soluble and hence especially suitable, since relatively high concentrations of the aqueous metal salt solutions (as reactant) can be established.

The amount of the charge number of the anionic and anionogenic groups present in the polymeric dispersant is the charge number which is present on complete deprotonation of the anionogenic group.

Anionic groups are the deprotonated acid groups present in the polymeric dispersant. Anionogenic groups are the acid groups present in the polymeric dispersant. Groups which are both anionic and anionogenic, such as partially deprotonated polybasic acid residues, are assigned exclusively to the anionic groups when forming the sum of the molar amounts of the anionic and anionogenic groups present in the polymeric dispersant.

The term "different kinds of polyvalent metal cations" refers to polyvalent metal cations of different elements. Furthermore, the term "different kinds of polyvalent metal cations" also refers to metal cations of the same element with different charge numbers.

Anionic and anionogenic groups of the polymeric dispersant are said to be of different kinds when they cannot be converted into one another by protonation.

The ratio according to formula (a) is preferably in the range from >1 to 30 or 1.01 to 10. More preferably, the ratio is in the range from 1.01 to 8 or 1.1 to 8 or 1.01 to 6 or 1.1 to 6 or 1.2 to 6, and more particularly in the range from 1.01 to 5 or 1.1 to 5 or 1.2 to 5 or 1.25 to 5.

Even when there is a superstoichiometric amount of the polyvalent metal cation, some of the acid groups of the polymeric dispersant may be present in the form of anionogenic groups.

In one preferred embodiment, the additive for hydraulically setting compositions comprises at least one anion which is capable of forming a low-solubility salt with the polyvalent metal cation, a low-solubility salt being a salt whose solubility in water under standard conditions of 20° C. and atmospheric pressure is less than 5 g/l, preferably less than 1 g/l.

According to one embodiment, the anion is selected from carbonate, oxalate, silicate, phosphate, polyphosphate, phosphite, borate, aluminate and sulphate. The anion is preferably selected from carbonate, silicate, phosphate and aluminate, and more preferably the anion is phosphate. The anion source is preferably a water-soluble acid or a water-soluble salt, where water-soluble acid or water-soluble salt refers to a solubility in water under standard conditions of 20° C. and atmospheric pressure of more than 20 g/l, preferably more than 100 g/l.

According to another embodiment, the anion is present in a quantity corresponding to the following formula (b):

$$0 \leq \frac{\sum_l z_{A,l} * n_{A,l}}{\sum_i z_{K,i} * n_{K,i}} < 3 \quad (b)$$

where $z_{K,i}$ is the amount of the charge number of the polyvalent metal cation, $n_{K,i}$ is the number of mols of the weighed-in polyvalent metal cation, $z_{A,l}$ is the charge number of the weighed-in anion, $n_{A,l}$ is the number of mols of the weighed-in anion.

The ratio according to formula (b) is preferably in the range from 0 to 3, preferably 0.1 to 2, more preferably 0.2 to 1.5. Each range mentioned above for formula (a) may be combined with each range for formula (b).

The stated anions also include the polymeric borate, silicate and oxalate anions, and also the polyphosphates. The term "polymeric anions" refers to anions which as well as oxygen atoms comprise at least two atoms from the group consisting of boron, carbon, silicon and phosphorus. With particular preference they are oligomers having a number of atoms of between 2 and 20, more particularly preferably 2 to 14 atoms, most preferably 2 to 5 atoms. The number of atoms in the case of the silicates is more preferably in the range from 2 to 14 silicon atoms, and in the case of the polyphosphates it is more preferably in the range from 2 to 5 phosphorus atoms.

Preferred silicates is $Na_2SiO_3$ and waterglass, with a modulus, defined as the ratio of $SiO_2$ to alkali metal oxide, in the range from 1/1 to 4/1, more preferably 1/1 to 3/1.

With the silicates it is possible for some of the silicon atoms in the silicates to be replaced by aluminium. Such compounds are known from the class of the aluminosilicates. The fraction of aluminium is preferably less than 10 mol %, based on the sum of silicon and aluminium, and more preferably the aluminium fraction is zero.

It has proved to be advantageous if the anion is phosphate and the ratio according to formula (b) is in the range from 0.2 to 1.

It has further proved to be advantageous if the anion is aluminate or carbonate and the ratio according to formula (b) is in the range from 0.2 to 2.

It has further proved to be advantageous if the anion is silicate and the ratio according to formula (b) is in the range from 0.2 to 2.

The counter cation of the anion salt which is able to form a low-solubility salt with the polyvalent metal cation is preferably a singly charged cation or a proton, preferably an alkali metal cation and/or ammonium ion. The ammonium ion may also comprise an organic ammonium ion, examples being alkylammonium ions having one to four alkyl radicals. The organic radical may also be of aromatic type or comprise aromatic radicals. The ammonium ion may also be an alkanolammonium ion.

The additive for hydraulically setting compositions may further comprise at least one neutralizing agent.

The neutralizing agent is preferably an organic amine, a polyamine or ammonia, since these neutralizing agents more effectively prevent the coagulation of precipitating salt. Suitable organic amines are more particularly an aliphatic monoamine or aliphatic polyamine. Polyamines include diamines and triamines.

M in the stated formulae is preferably an alkali metal ion, more particularly the sodium ion, ½ alkaline earth metal ion (i.e. one equivalent), more particularly ½ calcium ion, the ammonium ion, or an organic ammonium ion, such as a $C_1$-$C_4$ alkylamine or a monohydroxy-$C_1$-$C_4$ alkylamine.

The neutralizing agent is preferably selected from ammonia, monohydroxy-$C_1$-$C_4$ alkylamines, dihydroxy-$C_1$-$C_4$ alkylamines, trihydroxy-$C_1$-$C_4$ alkylamines, mono-$C_1$-$C_4$ alkylamines, di-$C_1$-$C_4$ alkylamines, tri-$C_1$-$C_4$ alkylamines, $C_1$-$C_4$ alkylenediamines, (tetrahydroxy-$C_1$-$C_4$ alkyl)-$C_1$-$C_4$ alkylenediamines, polyethylenimines, polypropylenimines and mixtures thereof.

More preferably the neutralizing agent is selected from ammonia, monohydroxy-$C_1$-$C_4$ alkylamines, dihydroxy-$C_1$-$C_4$ alkylamines, trihydroxy-$C_1$-$C_4$ alkylamines, $C_1$-$C_4$ alkylenediamines, and polyethylenimines.

More particularly preferred neutralizing agents are selected from ammonia, ethylenediamine, monoethanolamine, diethanolamine, triethanolamine and polyethylenimines.

The additive for hydraulically setting compositions preferably has a pH of 2 to 11.5, preferably 5 to 9, more particularly 6 to 8.

The anionic and anionogenic groups are preferably carboxyl, carboxylate or phosphate groups, hydrogenphosphate or dihydrogenphosphate groups.

In one embodiment the polymeric dispersant comprises at least one structural unit of the general formulae (Ia), (Ib), (Ic) and/or (Id) defined above, it being possible for the structural units (Ia), (Ib), (Ic) and (Id) to be the same or different both within individual polymer molecules and between different polymer molecules.

With particular preference, the structural unit of formula Ia is a methacrylic acid or acrylic acid unit, the structural unit of formula Ic is a maleic anhydride unit, and the structural unit of formula Id is a maleic acid or maleic monoester unit.

Where the monomers (I) are phosphoric esters or phosphonic esters, they may also include the corresponding diesters and triesters and also the monoester of diphosphoric acid. These esters come about in general during the esterification of organic alcohols with phosphoric acid, polyphosphoric acid, phosphorus oxides, phosphorus halides or phosphorus oxyhalides, and/or the corresponding phosphonic acid compounds, alongside the monoester, in different proportions, as for example 5-30 mol % of diester and 1-15 mol % of triester and also 2-20 mol % of the monoester of diphosphoric acid.

In one embodiment the polymeric dispersant comprises at least one structural unit of the general formulae (IIa), (IIb), (IIc) and/or (IId) defined above. The general formulae (IIa), (IIb), (IIc) and (IId) may be identical or different not only within individual polymer molecules but also between different polymer molecules. All structural units A may be identical or different both within individual polyether side chains and between different polyether side chains.

With particular preference the structural unit of formula IIa is an alkoxylated isoprenyl unit, alkoxylated hydroxybutyl vinyl ether unit, alkoxylated (meth)allyl alcohol unit or a vinylated methylpolyalkylene glycol unit, in each case preferably with an arithmetic average of 2 to 350 oxyalkylene groups.

According to one embodiment, the polymeric dispersant comprises the structural units of the formulae (I) and (II). Besides the structural units of the formulae (I) and (II), the polymeric dispersant may also comprise further structural units, which derive from radically polymerisable monomers, such as hydroxyethyl(meth)acrylate, hydroxypropyl(meth) acrylate, (meth)acrylamide, ($C_1$-$C_4$)alkyl(meth)acrylates, styrene, styrenesulphonic acid, 2-acrylamido-2-methylpropanesulphonic acid, (meth)allylsulphonic acid, vinylsulphonic acid, vinyl acetate, acrolein, N-vinylformamide, vinylpyrrolidone, (meth)allyl alcohol, isoprenol, 1-butyl vinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The average molecular weight $M_w$ of the salt made from polyvalent metal cation and polymeric dispersant, as determined by gel permeation chromatography (GPC), is generally in the range from approximately 15 000 to approximately 1 000 000.

The average molecular weight $M_w$ of the polymeric dispersant (comb polymer), preferably of the water-soluble comb polymer, as determined by gel permeation chromatography (GPC) is preferably 5000 to 200 000 g/mol, more preferably 10 000 to 80 000 g/mol, and very preferably 15 000 to 70 000 g/mol. The molecular weight was determined as described in more detail below.

The comb polymer preferably meets the requirements of the industrial standard EN 934-2 (February 2002).

The polymeric dispersants comprising the structural units (I) and (II) are prepared in a conventional way, by means of radical polymerisation, for example. This is described for example in EP0894811, EP1851256, EP2463314, EP0753488.

In one embodiment the polymeric dispersant is a polycondensation product which comprises the structural units (III) and (IV) defined above:

The structural units T and D in the general formulae (III) and (IV) in the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D may be selected independently of one another and may also each be derived from a mixture of the stated radicals. The groups B and E independently of one another are preferably O. All structural units A may be identical or different not only within individual polyether side chains but also between different polyether side chains. In one particularly preferred embodiment, A is $C_2H_4$.

In the general formula (III), a is preferably an integer from 1 to 300 and more particularly 5 to 150, and in the general formula (IV) b is preferably an integer from 1 to 300, more particularly 1 to 50 and more preferably 1 to 10. Furthermore, the radicals of the general formulae (III) or (IV) may independently of one another in each case possess the same chain length, in which case a and b are each represented by a number. In general it will be useful for mixtures with different chain lengths to be present, so that the radicals of the structural units in the polycondensation product have different numerical values for a and, independently, for b.

The polycondensation product of the invention generally has a weight-average molecular weight of 5000 g/mol to 200 000 g/mol, preferably 10 000 to 100 000 g/mol and more preferably 15 000 to 55 000 g/mol.

The molar ratio of the structural units (III):(IV) is typically 4:1: to 1:15 and preferably 2:1 to 1:10. It is advantageous to have a relatively high fraction of structural units (IV) in the polycondensation product, since a relatively high negative charge of the polymers has a good influence on the stability of the aqueous colloidally disperse preparation. The molar ratio of the structural units (IVa):(IVb), when both are present, is typically 1:10 to 10:1 and preferably 1:3 to 3:1.

In a preferred embodiment of the invention the polycondensation product comprises a further structural unit (V), which is represented by the formula below:

(V)

in which
$R^5$ is H, $CH_3$, COOH or substituted or unsubstituted phenyl or naphthyl;
$R^6$ is H, $CH_3$, COOH or substituted or unsubstituted phenyl or naphthyl.

Preferably $R_5$ and $R_6$ are H or one of the radicals $R_5$ and $R_6$ is H and the other is $CH_3$.

$R^5$ and $R^6$ in structural unit (V) are typically identical or different and are H, COOH and/or methyl. Very particular preference is given to H.

In another embodiment the molar ratio of the structural units [(III)+(IV)]:(V) in the polycondensate is 2:1 to 3:1, preferably 1:0.8 to 1:2.

The polycondensates are typically prepared by a process which comprises reacting with one another the compounds forming the basis for the structural units (III), (IV) and (V). The preparation of the polycondensate is for example described in WO 2006/042709 and WO 2010/026155.

The monomer with a keto group is preferably an aldehyde or ketone. Examples of monomers of the formula (V) are formaldehyde, acetaldehyde, acetone, glyoxylic acid and/or benzaldehyde. Formaldehyde is preferred.

The polymeric dispersant of the invention may also be present in the form of its salts, such as, for example, the sodium, potassium, organic ammonium, ammonium and/or calcium salt, preferably as the sodium and/or calcium salt.

The preparation preferably comprises the following combinations of polymeric dispersant with structural units of the above-stated formulae (Ia) to (Id), (IIa) to (IId) (polycarboxylate ethers and polyphosphate ethers, respectively) and also of the formulae (III) and (IV) (polycondensate), metal cation salt and optionally anion compound:
a) polycarboxylate ether+$Ca^{2+}$+phosphate
b) polycarboxylate ether+$Ca^{2+}$+aluminate
c) polycarboxylate ether+$Fe^{3+}$+$NH_4OH$
d) polycarboxylate ether+$Fe^{2+}$
e) polycarboxylate ether+$Al^{3+}$
f) polycarboxylate ether+$Al^{3+}$+phosphate
g) polycarboxylate ether+$Fe^{3+}$+phosphate
h) polycondensate+$Ca^{2+}$+phosphate
i) polycondensate+$Al^{3+}$
j) polycondensate+$Al^{3+}$+phosphate
k) polyphosphate ether+$Ca^{2+}$
l) polyphosphate ether+$Al^{3+}$
m) polyphosphate ether+$Fe^{3+}$ or $Fe^{2+}$
n) polyphosphate ether+$Ca^{2+}$+phosphate.

The additives preferably contain 50% to 95% water and 5% to 50% solid, more preferably 45%-85% water and 15% to 45% solid. The solid here comprises the polymer and also the polyvalent metal cation salt of the invention, and also, where appropriate, a further anion salt whose anion forms a low-solubility salt with the polyvalent metal cation.

The additive of the invention may take the form of an aqueous product in the form of a solution, emulsion or dispersion or in solid form, for example as a powder, after a drying step. The water content of the additive in solid form is in that case preferably less than 10% by weight, more preferably less than 5% by weight. It is also possible for some of the water, preferably up to 10% by weight, to be replaced by organic solvents. Advantageous are alcohols such as ethanol, (iso)propanol and 1-butanol, including its isomers. Acetone can be used as well. By the use of the organic solvents it is possible to influence the solubility and hence the crystallization behaviour of the salts of the invention.

The preparation of the invention has an average particle size distribution value of 10 nm to 100 μm, preferably 10 nm to 500 nm, as measured by dynamic light scattering—see example section.

The additives of the invention are produced by contacting the salt of the polyvalent metal cation and the polymeric dispersant in an aqueous medium, in solid form or in a polymer melt. Preference is given to using a water-soluble salt of the polyvalent metal cation. The salt of the metal cation may be provided in solid form, or else, expediently, as an aqueous solution or suspension. It is therefore possible to add the metal cation salt in the form of a powder, an aqueous solution or else an aqueous suspension to an aqueous solution of a dispersant.

The water-soluble anion salt may likewise be used both in solid form (preparation in situ of a solution, or contact with the polymer melt) or else preferably in the form of an aqueous solution.

An additive of the invention for hydraulically setting compositions may be obtained by precipitating the salt of the polyvalent metal cation in the presence of the polymeric dispersant, to give a colloidally disperse preparation of the salt. The precipitation of the salt of the polyvalent metal cation here means the formation of colloidally disperse salt particles which are dispersed by the polymeric dispersant and their further calculation is prevented.

Irrespective of whether the salt of the polyvalent metal cation is precipitated in the presence of the polymeric dispersant or whether a freshly precipitated salt of the polyvalent metal cation is dispersed in the presence of the polymeric dispersant, the additive of the invention for hydraulically setting compositions may also be obtained, alternatively, by additionally admixing the preparation with a neutralizing agent as described above.

An additive of the invention for hydraulically setting compositions may also be obtained by treating a hydroxide and/or oxide of the polyvalent metal cation with an acid, to give a colloidally disperse preparation of the salt of the polyvalent metal cation, in which case the acid is selected preferably from boric acid, carbonic acid, oxalic acid, silicic acid, polyphosphoric acid, phosphoric acid and/or phosphorous acid.

The additive is prepared generally by mixing the components, which are preferably in the form of an aqueous solution. In this case it is preferred first to mix the polymeric dispersant (comb polymer) and the polyvalent metal cation and then to add the anion which is capable of forming a low-solubility salt with the polyvalent metal cation. According to another embodiment, the polymeric dispersant (comb polymer) and the anion which is capable of forming a low-solubility salt with the polyvalent metal cation are mixed first, and then the polyvalent metal cation is added. To adjust the pH it is then possible to add an acid or base. The components are mixed generally at a temperature in the range from 5 to 80° C., usefully 10 to 40° C., and more particularly at room temperature (about 20-30° C.).

An additive of the invention for hydraulically setting compositions may also be obtained by dispersing a freshly precipitated salt of the polyvalent metal cation in the presence of the polymeric dispersant, to give a colloidally disperse preparation of the salt. Freshly precipitated here means immediately subsequent to the precipitation, i.e. within about 5 minutes, preferably 2 minutes or 1 minute.

The preparation may take place continuously or batchwise. The mixing of the components is accomplished in general in a reactor with a mechanical stirring mechanism. The stirring speed of the stirring mechanism may be between 10 rpm and 2000 rpm. An alternative option is to mix the solutions using a rotor-stator mixer, which may have stirring speeds in the range from 1000 to 30 000 rpm. Furthermore, it is also possible to use different mixing geometries, such as a continuous process in which the solutions are mixed using a Y-mixer, for example.

If desired, a further step in the method may follow, for the drying of the inorganically modified comb polymer. Drying may be accomplished by roll drying, spray drying, drying in a fluidised bed process, by bulk drying at elevated temperature, or by other customary drying methods. The preferred range of the drying temperature lies between 50 and 230° C.

The additive of the invention for hydraulically setting compositions may be used as a slump retainer in water-containing building material mixtures which comprise a hydraulic binder, the hydraulic binder being selected from (Portland) cement, slag sand, flyash, silica dust, metakaolin, natural pozzolans, burnt oil shale, calcium aluminate cement or mixes of two or more of these components.

The concept of the slump retainer in this application means that the additives, over a processing life of up to 90 minutes, preferably up to 60 minutes, after the mixing of the building material mixture with water, produce a slump of the binder suspension that is as sufficient as possible for the conditions of the application case in question, is extremely high and in particular does not drop substantially over the aforementioned time period. The additives make it possible to set a profile of properties which is tailored to the respective application. Moreover, it is possible to add the additive not only during mortar or concrete production but instead during production of the cement itself. In that case the additive at the same time fulfils the function of a grinding assistant.

The concrete additives, in addition to the colloidally disperse preparation of the invention, comprising polymeric plasticizer, polyvalent metal cation and anion of the invention, may also comprise further components. These further components include water-reducing plasticizers such as, for example, lignosulphonate, naphthalenesulphonate condensates, sulphonated melamine resins, or conventional polycarboxylate ethers, and also defoamers, air pore formers, retarders, shrinkage reducers and/or hardening accelerators.

The invention also relates to a building material mixture which comprises at least one additive of the invention and at least one binder. The binder is preferably selected from (Portland) cement, slag sand, flyash, silica dust, metakaolin, natural pozzolans, burnt oil shale, calcium aluminate cement and mixtures thereof. In addition the building material mixture may comprise customary constituents, such as curing accelerators, curing retarders, clay modifiers, shrinkage reducers, corrosion inhibitors, strength enhancers, water reducers, etc.

The addition of additive of the invention amounts in general to 0.1% to 4% by weight as a solid, based on the cement content of the building material mixture. It may be added as an aqueous colloidally disperse preparation or as a dried solid, in the form of a powder, for example.

EXAMPLES

Gel Permeation Chromatography

The sample preparation for the determination of molar weights took place by dissolving the polymer solution in the GPC buffer, to give a polymer concentration in the GPC buffer of 0.5% by weight. Thereafter this solution was filtered through a syringe filter with polyethersulphone membrane and a pore size of 0.45 µm. The injection volume of this filtrate was 50-100 µl.

The average molecular weights were determined on a GPC instrument from Waters with the model name Alliance 2690, with a UV detector (Waters 2487) and an RI detector (Waters 2410).

Columns: Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 µl
Detection: RI and UV The molecular weights of the polymers were determined relative to polyethylene glycol standards from the company PSS Polymer Standards Service GmbH. The molecular weight distribution curves of the polyethylene glycol standards were determined by means of light scattering. The masses of the polyethylene glycol standards were 682 000, 164 000, 114 000, 57 100, 40 000, 26 100, 22 100, 12 300, 6 240, 3 120, 2 010, 970, 430, 194, 106 g/mol.

Dynamic Light Scattering

The particle size distribution is determined using a Malvern Zetasizer Nano ZS (Malvern Instruments GmbH, Rigipsstr. 19, 71083 Herrenberg). The software utilised for measurement and evaluation is the Malvern software package belonging to the instrument. The measurement principle is based on dynamic light scattering, more particularly on non-invasive backscattering. The particle size distribution measured corresponds to the hydrodynamic diameter Dh of the conglomerate composed of comb polymer, i.e. water reducer and inorganic core consisting of cations of the invention and anions of the invention.

The results of the measurements are an intensity distribution against the particle size. From this distribution, the software determines an average particle size. The algorithm used is stored in the Malvern software. The samples were measured after 1 to 10 days. For this measurement, 0.1% by weight solutions of the conglomerates composed of water reducer and cation of the invention and anion of the invention are used. The solvent used is Milli-Q water, i.e. ultra-pure water having a resistance of 18.2 mΩcm. The sample is introduced into a single-use plastic cuvette and subjected to measurement at a temperature of 25° C. 10 runs/measurement and 2 measurements per sample are carried out. The only results evaluated were those which had a sufficiently high data quality, i.e. which corresponded to the standards of the instrument software.

General Protocol—Spray Drying

The additives of the invention can be converted into powder form by spray drying. In that case the aqueous solutions or suspensions of the additives of the invention are dried using a spray dryer (e.g. Mobil Minor model from GEA Niro) at an entry temperature of about 230° C. and an exit temperature of about 80° C. For this purpose the aqueous solutions were admixed beforehand with 1% by weight (based on the solids content of the aqueous solution) of a mixture of Additin RC 7135 LD (antioxidant; Rhein Chemie GmbH) and with a polyethylene glycol-based, water-miscible solvent (50% by weight in each case). The powders obtained are admixed with 1% by weight of highly disperse silica (N20P, Wacker Chemie AG), ground using a Retsch Grindomix RM 200 mill at 8000 rpm for 10 seconds, and filtered using a 500 µm sieve.

Polymer Synthesis

The comb polymer P1 is based on the monomers maleic acid, acrylic acid and vinyloxybutylpolyethylene glycol 5800. The molar ratio of acrylic acid to maleic acid is 7. Mw=40 000 g/mol and was determined via GPC. The solids content is 45% by weight. The synthesis is described for example in EP0894811.

The comb polymer P2 is present in the form of a neutral aqueous solution of a copolymer of acrylic acid, maleic acid and vinyloxybutylpolyethylene glycol 1100. The molar ratio of acrylic acid to maleic acid is 6.5. The molecular weight is Mw 26 000 g/mol and the solids content is 44%.

The comb polymer P3 is a condensate of the building blocks phenolPEG5000 and phenoxyethanol phosphate. The molecular weight is 23 000 g/mol. The synthesis is described in DE102004050395. The solids content is 31%.

Lupasol FG is a commercial product of BASF SE. It is a polyethylenimine having a molar mass Mw of 800 g/mol.

Phosphoric Ester-Containing Comb Polymer P4

A glass reactor equipped with stirrer, thermometer, pH electrode and a number of feed ports was charged with 180 g of deionised water, and this initial charge was heated to a polymerisation starting temperature of 80° C. In a separate feed vessel, 4669 g of a 25.7% strength aqueous methylpolyethylene glycol (5000) methacrylic ester solution were mixed with 297.6 g of hydroxyethyl methacrylate phosphoric acid ester (HEMA-phosphate) and 190.2 g of a 20% strength NaOH solution (corresponding to solution A). In a further separate feed vessel, 13.71 g of sodium peroxodisulphate were mixed with 182.1 g of water (solution B). In a third feed, a 25% strength solution was prepared with 13.2 g of 2-mercaptoethanol and 39.6 g of deionised water (solution C).

Following the preparation of solutions A, B and C, the addition of all three solutions to the stirred initial charge was commenced simultaneously. All of the additions were fed linearly into the initial charge over a period of 60 minutes.

After the end of the addition, the temperature was left at 80° C. for a further 30 minutes, after which the solution was cooled and was neutralized to a pH of 7.3 using 50% strength aqueous sodium hydroxide solution. The resulting copolymer was obtained as a clear solution, having a solids content of 27.8%. The average molecular weight of the copolymer was Mw 39 000 g/mol and Mp 34 000 g/mol, and the polydispersity was 1.55.

Polymer P5

A glass reactor equipped with stirrer, thermometer, pH electrode and a number of feed ports was charged with 510 g of deionised water and this initial charge was heated to a polymerisation starting temperature of 80° C. In a separate feed vessel, 5010 g of a 47.9% strength purified aqueous methylpolyethylene glycol (5000) methacrylic acid ester solution (Visiomer MPEG5005-MA-W from Evonik, containing, in addition to the MPEG5000 methacrylate, also 60.5 g of methacrylic acid (703 mmol)) were mixed with 250.2 g (2909 mmol) of methacrylic acid. In a further separate feed vessel, 31.99 g of sodium peroxodisulphate were mixed with 424.97 g of water (solution B). In a third feed, a 25% strength solution was prepared with 25.0 g of 2-mercaptoethanol and 75.0 g of deionised water (solution C).

Following preparation of solutions A, B and C, the addition of all three solutions to the stirred initial charge was commenced simultaneously. All of the additions were made linearly into the initial charge over a period of 60 minutes.

After the end of the addition, the temperature was left at 80° C. for a further 30 minutes, and the solution was cooled. This gave 6327 g of clear solution with a solids content of 42.75%. The batch was not neutralized, but was instead left in acidic aqueous form. The molecular weight was Mw 35 000 g/mol, with a polydispersity of 1.65.

Polymer P6

A 2 l four-necked flask with thermometer, reflux condenser and a connection for second feeds was charged with 1000 g of water, 700 g of vinyloxybutylpolyethylene glycol (VOBPEG 5800) (120.7 mmol), 0.02 g of FeSO4, 1.8 g of mercaptoethanol and 10 g of Brüggolit FF06 (sulfinic acid-based reducing agent; Brüggemann K G). Then 47.4 g of acrylic acid (99%, 651.8 mmol) and 5 g of 50% H2O2 were added. After 30 minutes, the pH has reached 4.3 and the polymer solution has a solids content of 43.0%. The molecular weight is 70 000 g/mol.

Example calculation of the charge density:

$$\Sigma_j z_{S,j} \times n_{S,j} \text{ in mmol per gram of polymer} = \frac{n(\text{number of mols of initial mass of acid monomers in mmol}) * \text{Charge number of acid monomer}}{m(\text{mass of polymer solution in g}) * \text{Solids content of the polymer solution in \%}}$$

Example calculation of the polymer P5 (for initial weighed amounts see the polymer synthesis)

$$\Sigma_j z_{S,j} \times n_{S,j} = \frac{(703 \text{ mmol} + 2909 \text{ mmol}) \cdot 1}{(6327 \text{ g} \cdot 42.75\%/100)} = 1.335 \text{ mmol/g}$$

Example calculation of the polymer P6

$$\Sigma_j z_{S,j} \times n_{S,j} = \frac{(651.8 \text{ mmol}) \cdot 1}{(1764 \text{ g} \cdot 43\%/100)} = 0.859 \text{ mmol/g}$$

Example calculation of formula (a) on the Basis of Example 41:

The corresponding masses are taken from the table of initial masses: mass of polymer P5 13.9 g and mass of aluminium nitrate nonahydrate 15.2 g.

Accordingly $$n_K = 15.2 \text{ g}/375 \text{ g/mol} = 40.5 \text{ mmol,}$$

$$n_S = 13.9 \text{ g} \cdot 1.335 \text{ mmol/g} = 18.56 \text{ mmol}$$

and $$\frac{\Sigma_i z_{K,i} * n_{K,i}}{\Sigma_j z_{S,j} * n_{S,j}} = \frac{40.5 \text{ mmol} \cdot 3}{18.56 \text{ mmol} \cdot 1} \cdot = 6.55$$

TABLE 1

| | Physical data of the reference polymers | | | | | |
|---|---|---|---|---|---|---|
| | P1 | P2 | P3 | P4 | P5 | P6 |
| $\Sigma_j z_{s,j} \times n_{s,j}$ in mmol per gram of polymer | 0.93 | 1.33 | 0.745 | 1.38 | 1.335 | 0.859 |
| Mw (GPC) | 40 000 | 26 000 | 23 000 | 39 000 | 35 000 | 70 000 |
| DLS (Dh, nm) | 11.3 | 8 | 10.3 | 10.7 | 10.4 | 14.7 |

Examples for the production of the additives of the invention

Instructions:

The aqueous solutions of the comb polymers are mixed with the metal cation salts of the invention, with the anion compounds of the invention, and also, optionally, with a base or acid for adjusting the pH, with stirring. Mixing is carried out in a 1 l jacketed glass reactor with paddle stirrer, temperature-conditioned at 20° C., at 300 rpm. The sequence of the addition is indicated in the table by a letter code. P stands for the aqueous solution of the comb polymer, K for the metal cation salt of the invention, A for the anion compound of the invention, and B and S for base and acid, respectively. If an index is indicated, the index relates to the sequence of addition of two components of the same kind. A code of $PK_1K_2AB$, for example, means that polymer P is introduced initially, then metal cation salt $K_1$ is added, followed by metal cation salt $K_2$. This is followed by the addition of the anion compound A and the addition of the base B. The amounts are always based on the solids content. The final pH of the resulting solutions or suspensions is likewise indicated.

Alternative Instructions

The solution of the comb polymer is introduced into a beaker with magnetic stirrer, and dilution takes place with the stated mass of water—see table. Subsequently the cation salt of the invention (for amounts see table) is added and is dissolved with stirring. Furthermore, the anion of the invention is added with stirring. Where appropriate, the pH is adjusted to the required value using a base. Viscous suspensions are formed in this procedure.

Examples of additives of the invention are collated in Tables 2 to 5 below:

TABLE 2

Composition of alkaline earth metal modified comb polymers

| No. | Polymer | Metal salt | Anion compound | Base/acid | pH | Sequence | Water (M %) | Polymer (M %) |
|---|---|---|---|---|---|---|---|---|
| 1 | P1 | Ca(NO$_3$)$_2$ | NaAlO$_2$ | HNO3 | 6.6 | PKAS | 70.1 | 21.3 |
| 2 | P1 | Ca(NO$_3$)$_2$ | NaAlO$_2$ | HNO3 | 7.0 | KAPS | 70.1 | 21.3 |
| 3 | P1 | Ca(NO$_3$)$_2$2 | NaAlO$_2$ | HNO3 | 6.6 | PKAS | 68.1 | 20.3 |
| 4 | P1 | Ca(NO$_3$)$_2$ | NaAlO$_2$ | HNO3 | 7.6 | PAKS | 68.1 | 20.3 |
| 5 | P1 | Ca(NO$_3$)$_2$ | Na$_2$CO$_3$ | — | 8.2 | PKA | 70.4 | 22.0 |
| 6 | P1 | Ca(NO$_3$)$_2$ | H$_3$PO$_4$ | NH4OH | 6.7 | PKAB | 70.9 | 21.1 |
| 7 | P1 | Ca(NO$_3$)$_2$ | H$_3$PO$_4$ | NaOH | 7.0 | PKAB | 73.6 | 22.7 |
| 8 | P1 | Ca(NO$_3$)$_2$ | H$_3$PO$_4$ | NaOH | 11 | PKAB | 73.6 | 22.7 |
| 9 | P1 | Ca(NO$_3$)$_2$ | H$_3$PO$_4$ | NaOH | 11 | PKAB | 55.2 | 38.2 |
| 10 | P1 | Ca(NO$_3$)$_2$ | H$_3$PO$_4$ | NaOH | 8.8 | PKAB | 72.5 | 21.1 |
| 11 | P1 | Ca(NO$_3$)$_2$ | H$_3$PO$_4$ | NaOH | 7 | PAKB | 72.5 | 21.1 |
| 12 | P1 | Ca(NO$_3$)$_2$ | H$_3$PO$_4$ | NaOH | 7 | KABP | 72.5 | 21.1 |
| 13 | P1 | Ca(NO$_3$)$_2$ | Na$_2$SiO$_3$ | HNO3 | 8 | PKAS | 69.1 | 17.3 |
| 14 | P1 | Ca(NO$_3$)$_2$ | Na$_2$CO$_3$ | — | 7.9 | PKA | 72.7 | 20.5 |
| 15 | P1 | Ca(NO$_3$)$_2$ | H$_3$PO$_4$ | NaOH | 9 | PKAB | 72.6 | 21.7 |
| 16 | P1 | Ca(NO$_3$)$_2$ | H$_3$PO$_4$ | NaOH | 11 | PKAB | 73.8 | 22.8 |
| 17 | P1 | Ca(NO$_3$)$_2$ | H$_3$PO$_4$ | NaOH | 11 | PKAB | 73.9 | 22.9 |
| 18 | P1 | Ca(NO$_3$)$_2$ | H$_3$PO$_4$ | NaOH | 11 | PKAB | 72.5 | 21.1 |
| 19 | P1 | Ca(NO$_3$)$_2$ | H$_3$PO$_4$ | NaOH | 11 | PKAB | 72.7 | 22.2 |
| 20 | P1 | Ca(NO$_3$)$_2$ | H$_3$PO$_4$ | NaOH | 11 | PKAB | 71.6 | 22.1 |
| 21 | P1 | Ca(NO$_3$)$_2$ | H$_3$PO$_4$ | NaOH | 10 | PKAB | 70.5 | 19.4 |
| 22 | P1 | Ca(NO$_3$)$_2$ | H$_3$PO$_4$ | NaOH | 10 | PKAB | 67.9 | 18.6 |
| 23 | P1 | Ca(NO$_3$)$_2$ | H$_3$PO$_4$ | NaOH | 10 | PKAB | 68.7 | 16.3 |
| 24 | P4 | Ca(NO$_3$)$_2$ | H$_3$PO$_4$ | NaOH | 7.1 | PAKB | 68.7 | 26.1 |
| 25 | P4 | Ca(OH)$_2$ | H$_3$PO$_4$ | | 6 | PAK | 60.3 | 3.9 |
| 26 | P4 | Ca(OH)$_2$ | H$_3$PO$_4$ | | 6.5 | PAK | 61.2 | 33.5 |
| 27 | P1 | SrCl$_2$x6H2O | H$_3$PO$_4$ | NaOH | 10 | PKAB | 71.7 | 22.7 |
| 28 | P1 | BaCl$_2$x2H2O | H$_3$PO$_4$ | NaOH | 9 | PKAB | 72.0 | 22.9 |
| 29 | P4 | Ca(NO$_3$)$_2$ | H$_3$PO$_4$ | | 4.6 | PAK | 65.8 | 21.0 |
| 30 | P3 | Ca(NO$_3$)$_2$ | H$_3$PO$_4$ | NaOH | 8 | PAKB | 66.2 | 29.2 |

| No. | Metal salt (M %) | Anion compound (M %) | Base/acid (M %) | $\dfrac{\sum_i z_{K,i} * n_{K,i}}{\sum_j z_{S,j} * n_{S,j}}$ | $\dfrac{\sum_i Z_{A,i} * n_{A,i}}{\sum_i Z_{K,i} * n_{K,i}}$ | DLS Dh, nm |
|---|---|---|---|---|---|---|
| 1 | 4.4 | 2.2 | 2.1 | 2.68 | 0.5 | |
| 2 | 4.4 | 2.2 | 2.1 | 2.68 | 1.0 | |
| 3 | 4.2 | 4.2 | 3.2 | 2.68 | 1.0 | 118 |
| 4 | 4.2 | 4.2 | 3.2 | 2.68 | 1.0 | |
| 5 | 4.5 | 3.1 | — | 2.68 | 1.07 | 171 |
| 6 | 4.1 | 2.4 | 1.4 | 2.56 | 1.47 | 110 |
| 7 | 2.6 | 0.5 | 0.8 | 1.48 | 0.45 | 241 |
| 8 | 2.6 | 0.5 | 0.8 | 1.48 | 0.45 | |
| 9 | 4.3 | 0.8 | 1.1 | 1.48 | 0.45 | |
| 10 | 4.3 | 0.9 | 1.2 | 2.68 | 0.5 | |
| 11 | 4.3 | 0.9 | 1.2 | 2.68 | 0.5 | |
| 12 | 4.3 | 0.9 | 1.2 | 2.68 | 0.5 | |
| 13 | 3.5 | 5.3 | 4.7 | 2.68 | 1.19 | |
| 14 | 4.2 | 2.7 | — | 2.68 | 1.0 | |
| 15 | 4.5 | 0.4 | 0.8 | 2.68 | 0.25 | |
| 16 | 2.2 | 0.5 | 0.8 | 1.25 | 0.54 | |
| 17 | 1.9 | 0.5 | 0.8 | 1.07 | 0.63 | |
| 18 | 4.3 | 0.9 | 1.2 | 2.68 | 0.50 | |
| 19 | 3.6 | 0.9 | 0.6 | 2.14 | 0.63 | |
| 20 | 5.4 | 0.9 | — | 3.22 | 0.42 | |
| 21 | 8.0 | 0.9 | 1.2 | 5.36 | 0.25 | |
| 22 | 12.7 | 0.9 | 1.1 | 8.94 | 0.15 | |
| 23 | 11.1 | 1.6 | 2.3 | 8.94 | 0.30 | |
| 24 | 5 | — | 0.2 | 1.63 | 0.58 | |
| 25 | 3.1 | 1.7 | — | 1.48 | 0.64 | |
| 26 | 3.6 | 1.7 | — | 2.09 | 0.45 | |
| 27 | 4.2 | 0.5 | 0.9 | 1.48 | 0.45 | |
| 28 | 3.9 | 0.5 | 0.8 | 1.48 | 0.45 | |
| 29 | 12.2 | 1.0 | | 5.2 | 0.18 | |
| 30 | 3.9 | 0.5 | 0.2 | 2.18 | 0.27 | |

TABLE 3

Composition of aluminium modified comb polymers

| No. | Polymer | Metal salt | Anion compound | Base/acid | pH | Sequence | Water (M %) | Polymer (M %) |
|---|---|---|---|---|---|---|---|---|
| 31 | P2 | Al(NO$_3$)3x9H$_2$O | | NaOH | 7 | PKB | 70.3 | 20.3 |
| 32 | P2 | Al(NO$_3$)3x9H$_2$O | | NaOH | 2.8 | PK | 69.1 | 22.7 |
| 33 | P1 | Al(NO$_3$)3x9H$_2$O | | NaOH | 7.0 | PKB | 70.1 | 20.5 |
| 34 | P1 | Al(NO$_3$)3x9H$_2$O | H$_3$PO$_4$ | NH$_4$OH | 7.3 | PKAB | 68.4 | 21.6 |
| 35 | P1 | Al(NO$_3$)3x9H$_2$O | H$_3$PO$_4$ | NH$_4$OH | 6.8 | PKAB | 67.7 | 21.2 |
| 36 | P1 | Al(NO$_3$)3x9H$_2$O | H$_3$PO$_4$ | NH$_4$OH | 6.9 | PKAB | 64.1 | 20.2 |
| 37 | P1 | Al(NO$_3$)3x9H$_2$O | H$_3$PO$_4$ | NH$_4$OH | 5.7 | PKAB | 78.7 | 9.1 |
| 38 | P1 | Al$_2$(SO$_4$)3x18H$_2$O | H$_3$PO$_4$ | NH$_4$OH | 6.5 | PKAB | 64.2 | 19.5 |
| 39 | P1 | Al(NO$_3$)3x9H$_2$O | Na$_2$CO$_3$ | NH$_4$OH | 8.2 | PKBA | 72.5 | 14.5 |
| 40 | P1 | Al(NO$_3$)3x9H$_2$O | Na$_2$SiO$_3$ | NH$_4$OH | 6.7 | PAKB | 64.0 | 18.0 |
| 41 | P5 | Al(NO$_3$)3x9H$_2$O | H$_3$PO$_4$ | NH$_4$OH | 7.8 | PKAB | 64.9 | 13.9 |
| 42 | P3 | Al(NO$_3$)3x9H$_2$O | H$_3$PO$_4$ | NaOH | 8 | PAKB | 64.5 | 28.6 |
| 43 | P3 | Al(NO$_3$)3x9H$_2$O | H$_3$PO$_4$ | NaOH | 3 | PKAB | 64.9 | 28.7 |
| 44 | P4 | Al(NO$_3$)3x9H$_2$O | H$_3$PO$_4$ | NaOH | 6.9 | PAKB | 66.0 | 22.8 |

| No. | Metal salt (M %) | Anion compound (M %) | Base/acid (M %) | $\dfrac{\sum_i z_{K,i} * n_{K,i}}{\sum_j z_{S,j} * n_{S,j}}$ | $\dfrac{\sum_i z_{A,i} * n_{A,i}}{\sum_i z_{K,i} * n_{K,i}}$ | DLS Dh, nm |
|---|---|---|---|---|---|---|
| 31 | 7.3 | — | 2.1 | 2.17 | 0 | 45 |
| 32 | 8.2 | — | — | 2.17 | 0 | |
| 33 | 7.3 | — | 2.2 | 3.06 | 0 | |
| 34 | 7.5 | 1.0 | 1.5 | 2.98 | 0.5 | 123 |
| 35 | 7.4 | 1.9 | 1.8 | 2.98 | 0.99 | >500 |
| 36 | 12.4 | 1.8 | 1.5 | 8.93 | 0.48 | 126 |
| 37 | 9.5 | 1.4 | 1.3 | 8.93 | 0.48 | 114 |
| 38 | 12.0 | 1.7 | 2.5 | 5.95 | 0.50 | 178 |
| 39 | 10.1 | 1.4 | 1.4 | 5.95 | 0.39 | 85 |
| 40 | 12.5 | 4.1 | 1.4 | 5.95 | 0.1 | 88 |
| 41 | 15.2 | 2.3 | 3.7 | 6.55 | 0.5 | |
| 42 | 5.5 | 0.5 | 0.9 | 2.07 | 0.28 | |
| 43 | 5.8 | 0.5 | 0.2 | 2.07 | 0.28 | |
| 44 | 8.3 | 1.1 | 1.9 | 2.10 | 0.44 | |

TABLE 4

Composition of iron-modified comb polymers

| No. | Polymer | Metal salt | Anion compound | Base/acid | pH | Sequence | Water (M %) | Polymer (M %) |
|---|---|---|---|---|---|---|---|---|
| 45 | P1 | Fe$_2$(SO$_4$)$_3$x1H$_2$O | | NH$_4$OH | 6.6 | PKB | 71.5 | 23.2 |
| 46 | P1 | Fe(NO3)3x9H2O | | NH$_4$OH | 7.0 | PKB | 68.6 | 22.1 |
| 47 | P1 | Fe(SO$_4$)x7H$_2$O | | NH$_4$OH | 7 | PKB | 70.5 | 23.4 |
| 48 | P1 | Fe$_2$(SO$_4$)$_3$x1H$_2$O | | NaOH | 2.2 | PK | 72.8 | 22.8 |
| 49 | P2 | FeCl$_3$x6H$_2$O | | NH$_4$OH | 6.4 | PKB | 51.1 | 37.0 |
| 50 | P1 | Fe$_2$(SO$_4$)$_3$x1H$_2$O | | Ethylenediamine | 5 | PKB | 70.8 | 23.6 |
| 51 | P1 | Fe$_2$(SO$_4$)$_3$x1H$_2$O | | Ethylenediamine | 5 | PBK | 70.8 | 23.6 |
| 52 | P1 | Fe$_2$(SO$_4$)$_3$x1H$_2$O | | Ethanolamine | 5 | PKB | 69.8 | 23.3 |
| 53 | P1 | Fe$_2$(SO$_4$)$_3$x1H$_2$O | | Lupasol FG | 7 | PKB | 69.4 | 23.1 |
| 54 | P1 | Fe$_2$(SO$_4$)$_3$x1H$_2$O | Na$_2$SiO$_2$ | NaOH | 7 | PKAB | 71.3 | 21.6 |
| 55 | P1 | Fe(NO$_3$)3x9H$_2$O | H$_3$PO$_4$ | NH$_4$OH | 7.2 | PKAB | 72.5 | 22.1 |
| 56 | P1 | Fe(NO$_3$)3x9H$_2$O | H$_3$PO$_4$ | NH$_4$OH | 7.2 | PKAB | 72.0 | 21.8 |
| 57 | P4 | FeCl$_3$x6H$_2$O | H$_3$PO$_4$ | NH$_4$OH | 7.6 | PKB | 66.3 | 25.0 |
| 58 | P3 | Fe$_2$(SO$_4$)$_3$x1H$_2$O | H$_3$PO$_4$ | NaOH | 3 | PAKB | 66.1 | 29.3 |
| 59 | P3 | Fe$_2$(SO$_4$)$_3$x1H$_2$O | H$_3$PO$_4$ | NaOH | 8 | PAKB | 65.3 | 28.9 |
| 60 | P3 | Fe(SO$_4$)x7H$_2$O | H$_3$PO$_4$ | NaOH | 8 | PAKB | 65.9 | 29.1 |

| No. | Metal salt (M %) | Anion compound (M %) | Base/acid (M %) | $\dfrac{\sum_i z_{K,i} * n_{K,i}}{\sum_j z_{S,j} * n_{S,j}}$ | $\dfrac{\sum_i z_{A,i} * n_{A,i}}{\sum_i z_{K,i} * n_{K,i}}$ | DLS Dh, nm |
|---|---|---|---|---|---|---|

TABLE 4-continued

Composition of iron-modified comb polymers

| | | | | | | |
|---|---|---|---|---|---|---|
| 45 | 4.4 | — | 0.9 | 2.95 | 0 | 36 |
| 46 | 8.2 | — | 1.1 | 2.95 | 0 | |
| 47 | 6.0 | — | 0.2 | 1.97 | 0 | |
| 48 | 3.3 | — | 1.1 | 2.2 | 0 | |
| 49 | 9.6 | — | 2.3 | 2.17 | 0 | 55 |
| 50 | 4.5 | — | 1.1 | 2.95 | 0 | |
| 51 | 4.5 | — | 1.1 | 2.95 | 0 | |
| 52 | 4.5 | — | 2.5 | 2.95 | 0 | |
| 53 | 4.4 | — | 3.0 | 2.95 | 0 | |
| 54 | 4.1 | 2.2 | 0.7 | 2.95 | 0.18 | |
| 55 | 3.8 | 0.4 | 1.2 | 2.68 | 0.20 | |
| 56 | 4.1 | 0.8 | 1.3 | 2.95 | 0.36 | |
| 57 | 6.5 | 1.2 | 1.0 | 2.13 | 0.43 | 48 |
| 58 | 4.1 | 0.5 | 0.1 | 2.70 | 0.22 | |
| 59 | 4.0 | 0.5 | 1.2 | 2.70 | 0.22 | |
| 60 | 4.3 | 0.5 | 0.2 | 1.41 | 0.41 | |

TABLE 5

Composition of zinc, manganese and copper modified comb polymers

| No. | Polymer | Metal salt | Anion compound | Base/acid | pH | Sequence | Water (M %) | Polymer (M %) | Metal salt (M %) | Anion compound (M %) | Base/acid (M %) | $\sum_i z_{K,i} \times n_{K,i} / \sum_i z_{S,i} \times n_{S,i}$ | $\sum_i Z_{A,i} * n_{A,i} / \sum_i Z_{K,i} * n_{K,i}$ | DLS Dh, nm |
|---|---|---|---|---|---|---|---|---|---|---|---|---|---|---|
| 61 | P4 | Zn(NO$_3$)$_2$x6H$_2$O | H$_3$PO$_4$ | NaOH | 7 | PKB | 63.2 | 21.6 | 12.3 | 1.1 | 1.9 | 2.8 | 0.33 | 245 |
| 62 | P4 | Zn(NO$_3$)$_2$x6H$_2$O | H$_3$PO$_4$ | NaOH | 7 | PKB | 66.4 | 24.6 | 7.0 | 1.2 | 0.8 | 1.4 | 0.66 | |
| 63 | P3 | Zn(NO$_3$)$_2$x6H$_2$O | H$_3$PO$_4$ | NaOH | 8 | PAKB | 65.7 | 29.0 | 4.6 | 0.5 | 0.2 | 1.42 | 0.41 | |
| 64 | P3 | MnSO$_4$x4H$_2$O | H$_3$PO$_4$ | | 8 | PAK | 67.1 | 29.7 | 2.7 | 0.5 | 0 | 1.43 | 0.41 | |
| 65 | P3 | CuSO4 | H$_3$PO$_4$ | H$_2$SO$_4$ | 3 | PAK | 67.5 | 29.3 | 2.4 | 0.4 | 0.4 | 1.36 | 0.41 | |

Application Tests

Mortar Tests

The mortar tests used were standard mortar tests in accordance with DIN EN 1015 using Mergelstetten CEM I 42.5 R and a w/c of 0.425. The weight ratio of sand to cement was 2.2 to 1. A mixture of 70% by weight standard sand (Normensand GmbH, D-59247 Beckum) and 30% by weight quartz sand was used. Prior to testing in the mortar, the polymer samples were defoamed using 1% by weight of triisobutyl phosphate, based on the polymer solids content.

The spread is obtained by shaking the slump flow table, in accordance with the aforementioned DIN method, by raising and impacting 15 times. The shearing forces which occur as a result of the tapping caused further spreading of the mortar. The diameter of the mortar cake after tapping is identified as the spread.

The addition figures reported are based always on the solids content of the polymer suspensions used, not on the active polymer content.

TABLE 6

Mortar results, alkaline earth metals

| | | | Spread (cm) | | | | | Delta 30 min, cm | 16 h Strength N/mm$^2$ | |
|---|---|---|---|---|---|---|---|---|---|---|
| No. | Polymer | Addition % | 4 min | 10 min | 30 min | 60 min | 90 min | | flexural | compressive |
| | P1 | 0.105 | 24.7 | 21.7 | 18.4 | | | | 3.434 | 11.86 |
| | P4 | 0.135 | 25.2 | 24 | 17.8 | | | | 3.63 | 11.89 |
| 3 | P1 | 0.24 | 22.6 | 25.8 | 25.4 | 24.2 | 22.1 | +7.0 | 3.517 | 11.64 |
| 1 | P1 | 0.185 | 26.1 | 25.8 | 23.9 | 20.4 | 18.5 | +5.5 | | |
| 2 | P1 | 0.20 | 20.8 | 23.7 | 24.0 | 22.1 | 20.1 | +5.6 | | |
| 4 | P1 | 0.21 | 23.2 | 25.3 | 24.8 | 24.7 | 22.7 | +6.4 | | |
| 5 | P1 | 0.165 | 26.4 | 26.1 | 24.2 | 23.1 | 19.8 | +5.8 | 2.28 | 9.51 |
| 6 | P1 | 0.24 | 25.6 | 25.7 | 24 | 21.9 | 19.8 | +5.6 | 1.912 | 7.47 |
| 7 | P1 | 0.16 | 25.5 | 25.3 | 23.9 | 23.2 | 21.9 | +5.5 | | |
| 8 | P1 | 0.21 | 23.2 | 23.7 | 24.6 | 24.4 | 22.9 | +6.2 | 3.41 | 11.1 |
| 9 | P1 | 0.22 | 22.5 | 25 | 26.3 | 25.9 | 24.3 | +7.9 | | |
| 10 | P1 | 0.215 | 24.8 | 25.8 | 24.7 | 23.3 | 22.5 | +6.3 | | |
| 11 | P1 | 0.195 | 23.1 | 24.3 | 23.2 | 22.7 | 21.3 | +4.8 | | |
| 12 | P1 | 0.20 | 24.9 | 23.1 | 21.7 | 20.4 | | +3.3 | | |
| 13 | P1 | 0.205 | 26.4 | 24.6 | 20.6 | 18.3 | — | +2.2 | | |
| 14 | P1 | 0.15 | 25.6 | 25.3 | 23.4 | 20.6 | — | +5.0 | | |
| 15 | P1 | 0.155 | 23.2 | 23.4 | 22.8 | 22.4 | 20.8 | +4.4 | | |
| 21 | P1 | 0.32 | 21.2 | 24 | 26.5 | 26.9 | 26.6 | +6.1 | | |

TABLE 6-continued

Mortar results, alkaline earth metals

| No. | Polymer | Addition % | Spread (cm) 4 min | 10 min | 30 min | 60 min | 90 min | Delta 30 min, cm | 16 h Strength N/mm² flexural | compressive |
|---|---|---|---|---|---|---|---|---|---|---|
| 22 | P1 | 0.32 | 19.8 | 22.8 | 24.7 | 25.4 | 25.0 | +6.3 | | |
| 23 | P1 | 0.32 | 19.4 | 21.6 | 23.3 | 23.9 | 23.7 | +4.9 | | |
| 24 | P4 | 0.19 | 26.4 | 27.5 | 26.2 | 24.4 | 23.1 | +8.4 | | |
| 25 | P4 | 0.22 | 23.2 | 22.9 | 22.6 | | | +4.2 | | |
| 26 | P4 | 0.30 | 21.5 | 23.2 | 22.9 | | | +4.5 | | |
| 27 | P1 | 0.18 | 23.7 | 26.1 | 27 | 25.3 | 20.5 | +8.6 | | |
| 28 | P1 | 0.15 | 23.8 | 23.6 | 22.2 | 20.3 | | +3.8 | | |
| 29 | P4 | 0.6 | 23.5 | 22.1 | 21.4 | 22.8 | 23.2 | +3.6 | | |

TABLE 7

Mortar results, aluminium

| No. | Polymer | Addition % | Spread (cm) 4 min | 10 min | 30 min | 60 min | 90 min | Delta. 30 min, cm | 16 h Strength N/mm2 flexural | compressive |
|---|---|---|---|---|---|---|---|---|---|---|
| | P1 | 0.105 | 24.7 | 21.7 | 18.4 | | | | 3.434 | 11.86 |
| | P2 | 0.145 | 25.4 | 21.8 | 19.1 | | | | 2.425 | 7.89 |
| | P4 | 0.135 | 25.2 | 24 | 17.8 | | | | 3.63 | 11.89 |
| | P5 | 0.11 | 26.2 | 22 | 18.2 | | | | | |
| 31 | P2 | 0.21 | 24.2 | 22.6 | 20.1 | 18.3 | | +1.0 | | |
| 32 | P2 | 0.22 | 25.3 | 25 | 23.6 | 20.7 | 19.3 | +4.5 | 1.504 | 5.16 |
| 33 | P1 | 0.14 | 24.2 | 22.5 | 19.4 | | | +1.0 | | |
| 34 | P1 | 0.2 | 23.6 | 25.6 | 25.5 | 24.6 | 23.2 | +7.1 | 2.079 | 7.14 |
| 35 | P1 | 0.19 | 26.4 | 26.7 | 25.5 | 22.1 | 19.7 | +7.1 | 2.05 | 8.27 |
| 36 | P1 | 0.30 | 20.8 | 23.0 | 24.5 | 25.5 | 24.0 | +6.1 | 2.189 | 6.87 |
| 37 | P1 | 0.30 | 21.8 | 23.4 | 23.6 | 23.8 | 22.5 | +5.2 | | |
| 38 | P1 | 0.26 | 24.6 | 24.8 | 23.7 | 21.3 | 19.8 | +5.3 | 1.445 | 5.753 |
| 39 | P1 | 0.21 | 24.8 | 25.1 | 24.6 | 22.7 | 20.3 | +6.2 | 3.174 | 11.09 |
| 40 | P1 | 0.215 | 23.3 | 23.9 | 22.4 | 21.5 | 18.6 | +4.0 | 3.576 | 11.972 |
| 41 | P5 | 0.27 | 25.2 | 25.3 | 26.4 | 25.7 | 23.7 | +8.2 | | |
| 44 | P4 | 0.20 | 22.7 | 24.1 | 23.5 | 20.4 | | +6.7 | | |

TABLE 8

Mortar results, iron

| No. | Polymer | Addition % | Spread (cm) 4 min | 10 min | 30 min | 60 min | 90 min | Delta 30 min, cm | 16 h Strength N/mm2 flexural | compressive |
|---|---|---|---|---|---|---|---|---|---|---|
| | P1 | 0.105 | 24.7 | 21.7 | 18.4 | | | | 3.434 | 11.86 |
| | P2 | 0.145 | 25.4 | 21.8 | 19.1 | | | | 2.425 | 7.89 |
| | P4 | 0.135 | 25.2 | 24 | 17.8 | | | | 3.63 | 11.89 |
| 45 | P1 | 0.18 | 25.9 | 27.1 | 24.9 | 24.5 | 23.2 | +6.5 | 3.077 | 10.812 |
| 46 | P1 | 0.235 | 23.4 | 24.3 | 24.2 | 23.4 | 22.3 | +5.8 | | |
| 47 | P1 | 0.25 | 24.5 | 24 | 24.4 | 23.9 | 22.7 | +6.0 | | |
| 48 | P1 | 0.145 | 24.8 | 24.3 | 24.1 | 22.2 | 21.3 | +5.7 | | |
| 49 | P2 | 0.21 | 26.2 | 25.8 | 23.9 | 22.2 | 21.3 | +4.8 | 1.87 | 6.05 |
| 50 | P1 | 0.220 | 23.4 | 24.1 | 22.2 | 21.6 | | +3.8 | | |
| 51 | P1 | 0.21 | 24.9 | 24.2 | 22.9 | 21.4 | | +4.5 | | |
| 52 | P1 | 0.220 | 23.4 | 23.1 | 22.4 | 21.7 | | +4.0 | 3.35 | 11.87 |
| 53 | P1 | 0.22 | 24.8 | 24.2 | 23.1 | 22.5 | 20.7 | | 3.44 | 12.1 |
| 54 | P1 | 0.110 | 25.4 | 24.3 | 22.4 | 20.6 | | +4.0 | | |
| 55 | P1 | 0.24 | 23.2 | 24.7 | 25.8 | 26.4 | 25.6 | +7.4 | | |
| 56 | P1 | 0.24 | 22.7 | 24.2 | 25.8 | 26.5 | 26.0 | +7.4 | | |
| 57 | P4 | 0.27 | 23.2 | 26.1 | 25 | 25.0 | 26.2 | +7.2 | | |

TABLE 9

Mortar results, zinc

| No. | Polymer | Addition % | Spread (cm) | | | | | Delta 30 min, cm | 16 h Strength N/mm2 | |
|---|---|---|---|---|---|---|---|---|---|---|
| | | | 4 min | 10 min | 30 min | 60 min | 90 min | | flexural | compressive |
| | P4 | 0.135 | 25.2 | 24 | 17.8 | | | | 3.63 | 11.89 |
| 61 | P4 | 0.25 | 24.8 | 25.9 | 25.6 | 24.8 | 23 | +7.8 | 1.81 | 6.91 |
| 62 | P4 | 0.2 | 25.2 | 26.1 | 24.9 | 24.3 | 22.2 | +7.1 | | |

As the mortar results show, the comb polymers modified in accordance with the invention all exhibit longer retention of consistency, as compared with the unmodified original comb polymers. Moreover, the compressive strength of the modified comb polymers is frequently very close to that of the original comb polymers or even is improved (see Example 40, 51, 52). The mortar strength development of the inventively modified comb polymers is superior to the customary use of formulations comprising comb polymer and cement hydration retarders or dynamic superplasticizers in accordance with EP 1 136 508 A1.

Concrete Tests

Concrete tests conducted were standard concrete tests in accordance with DIN EN 12350 with a cement content of 380 kg. The grading curve set corresponds to the A/B 16 classification according to DIN 1045-2.

The cements used were Mergelstetten CEM I 42.5 R, with a w/c value of 0.44, and also Karlstadt CEM I 42.5 R, with a w/c value of 0.47, and Bernburg CEM I 42.5 R, with a w/c of 0.46.

Prior to testing in the concrete, the polymer samples were defoamed with 1% by weight of triisobutyl phosphate, based on the polymer solids content.

Mixing Process

The dried aggregates as per grading curve, and the cement, are introduced into a forced mixer and mixed for 10 seconds. The mixture in the forced mixer is thereafter moistened with 10% of the total water, and mixing is continued for a further 2 minutes. Thereafter the remainder of the water is added, and mixing is continued for 1 minute more. Lastly the plasticizer is added, followed by mixing for 1 minute again.

The slump value is a measure of the extent to which the concrete cake collapses after the metal cone is lifted (difference in height between the top edge of the metal cone and the height of the concrete cake after removal of the metal mould). The slump flow corresponds to the base diameter of the concrete cake after collapse.

The spread is obtained by shaking the slump flow board, in accordance with the abovementioned DIN method, by raising and impacting 15 times. The shearing forces which occur as a result of the tapping produce a further spread of the concrete. The diameter of the concrete cake after tapping is identified as the spread.

Polymer P1 is a strong water reducer, i.e. a dispersant with a high level of initial plasticization when added at low levels, while the retention of the slump is fairly low.

The additions reported are based in each case on the solids content of the polymer suspensions used, not on the active polymer content.

TABLE 10

Results of the concrete tests, cement: Mergelstetten CEM I 42.5 R, w/c = 0.44

| No. | Polymer | Addition % | Air % | Slump in cm | | | | Slump flow in cm | | | |
|---|---|---|---|---|---|---|---|---|---|---|---|
| | | | | 0 min | 10 min | 30 min | 60 min | 0 min | 10 min | 30 min | 60 min |
| | P1 | 0.105 | 2.1 | 21 | 4.5 | | | 36 | 20 | | |
| 45 | P1 | 0.18 | 1.75 | 23 | 22.5 | 8.5 | | 48 | 44 | 23.5 | |
| 37 | P1 | 0.35 | 1.40 | 24 | 24 | 23 | 22 | 47 | 51 | 46 | 41 |
| 10 | P1 | 0.27 | 1.75 | 23 | 23.5 | 21 | 17 | 39.5 | 45 | 34.5 | 29.5 |

| No. | Polymer | Spread in cm | | | | Delta 10 min, cm | Compressive strength 24 h | MPa 28 d |
|---|---|---|---|---|---|---|---|---|
| | | 0 min | 10 min | 30 min | 60 min | | | |
| | P1 | 56.5 | 38.5 | | | | 18.6 | 71.6 |
| 45 | P1 | 61 | 58.5 | 45 | | +20.0 | 21.6 | 76.6 |
| 37 | P1 | 59 | 60.5 | 58.5 | 55 | +22.0 | 19.2 | 80.9 |
| 10 | P1 | 57 | 59.5 | 54 | 49 | +21.0 | 21.15 | 79.2 |

TABLE 11

Results of the concrete tests, cement: Karlstadt CEM I 42.5 R, w/c = 0.47

| No. | Plasticizer | Addition % | Air % | Slump in cm | | | | Slump flow in cm | | | |
|---|---|---|---|---|---|---|---|---|---|---|---|
| | | | | 0 min | 10 min | 30 min | 60 min | 0 min | 10 min | 30 min | 60 min |
| | P4 | 0.12 | 1.95 | 22 | 11 | 3.5 | | 35 | 23.5 | 20 | |
| 25 | P4 | 0.23 | 1.3 | | | | | | | | |
| 26 | P4 | 0.31 | 1.65 | | | | | | | | |

TABLE 11-continued

Results of the concrete tests, cement: Karlstadt CEM I 42.5 R, w/c = 0.47

| No. | Plasticizer | Spread in cm | | | | Delta spread | Compressive strength | MPa |
| --- | --- | --- | --- | --- | --- | --- | --- | --- |
| | | 0 min | 10 min | 30 min | 60 min | 30 min, cm | 24 h | 28 d |
| | P4 | 56 | 44.5 | 36.5 | | | 21.20 | |
| 25 | P4 | 55.5 | 61.5 | 55 | | +18.5 | | |
| 26 | P4 | 48 | 58 | 57 | | +20.5 | | |

TABLE 12

Results of the concrete tests, cement: Bernburg CEM I 42.5 R, w/c = 0.46

| No. | Plasticizer | Addition % | Air % | Slump in cm | | | | Slump flow in cm | | | |
| --- | --- | --- | --- | --- | --- | --- | --- | --- | --- | --- | --- |
| | | | | 0 min | 10 min | 30 min | 60 min | 0 min | 10 min | 30 min | 60 min |
| | P1 | 0.115 | 2.0 | 21.5 | 14 | 3 | | 35 | 26 | 20 | |
| | P2 | 0.15 | 1.9 | 21.0 | 17.0 | 3.5 | | 34.5 | 27.5 | 20.5 | |
| | P3 | 0.16 | 2.15 | 21.5 | 17.0 | 2 | | 34.5 | 28.0 | 20 | |
| | P4 | 0.125 | 2.0 | 22.0 | 15.0 | 3 | | 36.0 | 26 | 20 | |
| 10 | P1 | 0.32 | 1.4 | 17.5 | 25.5 | 25.5 | 23 | 29.5 | 54 | 53.5 | 39 |
| 62 | P4 | 0.195 | 2.2 | 20.5 | 18.5 | 4 | | 32.5 | 31.5 | 20 | |
| 8 | P1 | 0.235 | 1.8 | 17 | 22 | 19.5 | 11.5 | 28 | 38.5 | 32 | 25 |
| 52 | P1 | 0.245 | 1.9 | 21 | 23 | 14.5 | 5 | 34 | 41 | 26 | 20 |
| 16 | P1 | 0.23 | 1.95 | 16 | 23 | 16 | 7.5 | 27.5 | 39.5 | 27.5 | 21 |
| 17 | P1 | 0.20 | 2.3 | 16.5 | 19 | 8 | 2.5 | 28.5 | 31.5 | 31 | 20 |
| 3 | P1 | 0.3 | 1.7 | 18 | 24 | 22.5 | 19.5 | 29 | 44.5 | 38 | 31 |
| 18 | P1 | 0.3 | 1.6 | 15.5 | 25 | 24.5 | 21.5 | 28.5 | 48.5 | 46 | 35 |
| 19 | P1 | 0.28 | 1.9 | 16 | 23.5 | 22 | 18 | 28 | 42 | 36 | 30.5 |
| 20 | P1 | 0.33 | 1.75 | 14.5 | 25 | 24.5 | 22.5 | 27.5 | 49 | 49 | 37.5 |
| 42 | P3 | 0.25 | 2.15 | 20.5 | 17.0 | 5.5 | | 32.5 | 29.0 | 20.5 | |
| 43 | P3 | 0.25 | 1.80 | 19.0 | 23.5 | 15.5 | 7.0 | 31.0 | 41.0 | 28.0 | 21.0 |
| 60 | P3 | 0.4 | 1.80 | 29.5 | 42.0 | 35.5 | 29.0 | 17.5 | 24.0 | 22.0 | 16.0 |
| 59 | P2 | 0.24 | 2.20 | 18.5 | 21.0 | 8.0 | 3.0 | 31.0 | 33.0 | 22.0 | 20.0 |
| 58 | P3 | 0.27 | 2.05 | 17.0 | 22.0 | 14.5 | 6.5 | 28.0 | 35.5 | 27.5 | 21.5 |
| 30 | P3 | 0.70 | 1.90 | 6.5 | 13.5 | 21.0 | 22.5 | 21.5 | 26.5 | 33.0 | 37.0 |
| 63 | P3 | 0.5 | 1.85 | 9.0 | 12.5 | 13.0 | 10.5 | 22.0 | 26.0 | 26.0 | 24.0 |
| 64 | P3 | 0.5 | 1.85 | 18.5 | 23.0 | 18.5 | 13.0 | 29.5 | 42.0 | 29.5 | 25.5 |
| 65 | P3 | 0.205 | 1.90 | 22.0 | 23.0 | 15.0 | 4.5 | 34.0 | 38.0 | 26.0 | 20.0 |

| No. | Plasticizer | Spread in cm | | | | Delta spread | | Compressive strength MPa | |
| --- | --- | --- | --- | --- | --- | --- | --- | --- | --- |
| | | 0 min | 10 min | 30 min | 60 min | 10-0 min | 30-0 min | 24 h | 28 d |
| | P1 | 58.5 | 48.5 | 34.5 | | | | 27.25 | 62.3 |
| | P2 | 58.0 | 50.0 | 37.0 | | | | | |
| | P3 | 57.5 | 49.5 | 35.0 | | | | | |
| | P4 | 59.5 | 49.0 | 35.0 | | | | | |
| 10 | P1 | 52 | 66 | 65.5 | 58.5 | 17.5 | 31 | 29.1 | 66.3 |
| 62 | P4 | 56 | 54 | 39.5 | | 5 | 4.5 | 26.45 | |
| 8 | P1 | 54.5 | 58 | 55.5 | 46 | 9.5 | 21 | 31.05 | |
| 52 | P1 | 57 | 60.5 | 49.5 | 40 | 12 | 15 | 31.15 | |
| 16 | P1 | 52.5 | 58.5 | 50 | 41.5 | 10 | 15.5 | 30.15 | |
| 17 | P1 | 53 | 53.5 | 42.5 | 36 | 5 | 8 | 29.10 | |
| 3 | P1 | 53 | 63 | 59.5 | 53 | 14.5 | 25 | 31.35 | |
| 18 | P1 | 52 | 62.5 | 65.5 | 56.5 | 14 | 31 | 30.4 | |
| 19 | P1 | 51.5 | 62.5 | 59 | 52 | 14 | 24.5 | 29.50 | |
| 20 | P1 | 52.5 | 65 | 64 | 58.5 | 16.5 | 29.5 | 28.95 | |
| 42 | P3 | 53.5 | 50.5 | 39.5 | | 1 | 4.5 | 26.2 | |
| 43 | P3 | 54.0 | 62.0 | 49.5 | 39.5 | 12.5 | 14.5 | 27.45 | |
| 60 | P3 | 53.0 | 61.5 | 56.5 | 49.5 | 12 | 21.5 | 26.45 | |
| 59 | P2 | 53.5 | 54.0 | 41.5 | 36.5 | 4 | 4.5 | 27.90 | |
| 58 | P3 | 50.0 | 55.5 | 47.0 | 40.0 | 6 | 12.0 | 29.05 | |
| 30 | P3 | 41.0 | 46.5 | 53.0 | 55.5 | -3 | 18.0 | 27.55 | |
| 63 | P3 | 42.5 | 46.0 | 46.0 | 43.5 | -3.5 | 11.0 | 23.20 | |
| 64 | P3 | 54.5 | 62.5 | 54.0 | 45.5 | 13 | 19.0 | 26.20 | |
| 65 | P3 | 59.0 | 59.0 | 48.0 | 37.5 | 9.5 | 13.0 | | |

The concrete strengths after 24 hours of the inventively modified comb polymers is better than the reference in all cases for the polymer P1. This demonstrates the outstanding suitability of the preparations of the invention as slump retainers with very good early strength development.

It is clearly evident from the concrete slump and concrete slump flow data that the additives of the invention have distinct advantages in terms of consistency retention. This means that, although the initial addition is somewhat higher, at later times (e.g. after 60 minutes) the flow capacity is nevertheless significantly improved in comparison to the unmodified plasticizers. This is accompanied by early strengths (24 h) and ultimate strengths (28 d) which are higher than those of the unmodified plasticizers. Overall, the additives of the invention bring about a significantly extended consistency retention in the concrete by virtue of the inventively modified plasticizers, and also increased early and ultimate strengths in the concrete.

If the amount of polymeric dispersant is calculated from the figures in the initial weighed mass tables, it is also possible to compare the pure polymer additions. This means that, for example, the solids addition from Example 18 in Bernburg cement concrete, of 0.3%, can be converted into a polymer addition of 0.23%.

TABLE 13

Alkaline earth metal hydroxide (colloidally disperse by neutralization)

| No. | Polymer | Metal salts | Anion comp. | Base/ acid | pH | Sequence | Water (M %) | Polymer (M %) | Metal salt 1 (M %) | Acid (M %) | Anion comp. (M %) | Base (M %) | $\dfrac{\sum_i z_{K,i} * n_{K,i}}{\sum_j z_{S,j} * n_{S,j}}$ | $\dfrac{\sum_l Z_{A,l} * n_{A,l}}{\sum_j Z_{K,j} * n_{K,j}}$ |
|---|---|---|---|---|---|---|---|---|---|---|---|---|---|---|
| 66 | P6 | Ca(OH)$_2$ | H$_3$PO$_4$ | NaOH | 10.0 | PK$_1$SAB | 78.24 | 14.71 | 1.46 | 3.68[1] | 0.64 | 1.27 | 3.12 | 0.5 |
| 67 | P6 | Ca(OH)$_2$ | H$_3$PO$_4$ | NaOH | 9.5 | PK$_1$SAB | 82.03 | 8.76 | 2.31 | 5.75[1] | 0.38 | 0.77 | 8.33 | 0.19 |
| 68 | P6 | Ca(OH)$_2$ | H$_3$PO$_4$ | NaOH | 10.13 | PK$_1$SAB | 81.1 | 10.3 | 2.0 | 5.3[1] | 0.4 | 0.9 | 6.25 | 0.25 |
| 69 | P6 | Ca(OH)$_2$ | H$_3$PO$_4$ | NaOH | 9.3 | PK$_1$SAB | 73.0 | 18.0 | 1.8 | 5.7[2] | 0.8 | 0.8 | 3.12 | 0.5 |
| 70 | P6 | Ca(OH)$_2$ | H$_3$PO$_4$ | NaOH | 10.3 | PK$_1$SAB | 75.0 | 17.4 | 1.7 | 3.3[2] | 0.8 | 1.9 | 3.12 | 0.5 |
| 71 | P6 | Ca(OH)$_2$ | H$_3$PO | NaOH | 10.2 | PK$_1$SAB | 75.7 | 18.3 | 1.8 | 2.2[2] | 0.8 | 1.2 | 3.12 | 0.5 |
| 72 | P6 | Ca(OH)$_2$ | H$_3$PO$_4$ | NaOH | 10.0 | PK$_1$SAB | 77.1 | 16.6 | 1.6 | 3.2[1] | 0.7 | 0.7 | 3.12 | 0.5 |
| 73 | P1 | Ca(OH)$_2$ | H$_3$PO$_4$ | NaOH | 9.4 | PK$_1$SAB | 76.7 | 16.3 | 1.5 | 3.9[1] | 0.7 | 1.0 | 2.68 | 0.5 |
| 74 | P1 | Ca(OH)$_2$ | H$_3$PO$_4$ | NaOH | 9.35 | PK$_1$SAB | 73.5 | 21.7 | 1.0 | 2.6[1] | 0.4 | 0.8 | 1.34 | 0.5 |
| 75 | P1 | Ca(OH)$_2$ | H$_3$PO$_4$ | NaOH | 9.7 | PK$_1$SAB | 66.8 | 28.5 | 1.3 | 1.6[3] | 0.6 | 1.2 | 1.34 | 0.5 |

[1]Amidosulphonic acid
[2]Acetic acid
[3]Formic acid

TABLE 14

Results of the mortar tests, cement: Bernburg CEM I 42.5 R, w/c = 0.42

| | | | Spread (cm) | | | | | |
|---|---|---|---|---|---|---|---|---|
| No. | Polymer | Addition % | 4 min | 10 min | 30 min | 60 min | 90 min | Delta (30 min, cm) |
| | P6 | 0.13 | 25.6 | 21.0 | 18.1 | | | |
| 66 | P6 | 0.32 | 25.8 | 27.8 | 27.9 | 27.3 | 25.8 | +6.8 |
| 67 | P6 | 0.35 | 26 | 28.1 | 28.3 | 27.8 | 27.4 | +7.1 |
| 68 | P6 | 0.32 | 25.8 | 27.7 | 27.9 | 27.3 | 25.8 | +6.7 |
| 70 | P6 | 0.28 | 23.3 | 25.8 | 25.9 | 25.2 | 23.9 | +4.8 |
| 71 | P6 | 0.28 | 21.7 | 24.2 | 24.2 | 24.1 | 23.3 | +3.2 |
| 72 | P6 | 0.26 | 24.1 | 26.7 | 27.7 | 26.7 | 25.1 | +5.7 |

TABLE 15

Mixed metal salts and anions

| No. | Polymer | Metal salts | Anion Comp | Base/Acid | pH | Sequence | Water | Polymer (M %) |
|---|---|---|---|---|---|---|---|---|
| 76 | P1 | Ca(NO$_3$)$_2$/M | H$_3$PO$_4$ | NaOH | 10. | PK$_1$K$_2$AB | 73.3 | 22.4 |
| 77 | P1 | Ca(NO$_3$)$_2$/Al( | H$_3$PO$_4$ | NaOH | 9.5 | PK$_1$K$_2$AB | 73.3 | 21.3 |
| 78 | P1 | Ca(NO$_3$)$_2$/Al( | H$_3$PO$_4$ | NaOH | 9.4 | PK$_1$A$_1$K$_2$A | 73.3 | 21.3 |
| 79 | P1 | Ca(NO$_3$)$_2$/Al( | H$_3$PO$_4$ | NaOH | 9.1 | PK$_2$A$_1$K$_1$A | 73.3 | 21.3 |
| 80 | P1 | Ca(NO$_3$)$_2$ | H$_3$PO$_4$/NaAl | NaOH | 8.3 | PKA$_1$A$_2$B | 72.1 | 21.5 |
| 81 | P1 | Ca(NO$_3$)$_2$ | H$_3$PO$_4$/Na$_2$S | NaOH | 8.9 | PKA$_1$A$_2$B | 72.4 | 21.8 |
| 82 | P1 | Ca(NO$_3$)$_2$ | H$_3$PO$_4$/Na$_2$ | NaOH | 8 | PKA$_1$A$_2$B | 72.2 | 21.8 |
| 83 | P1 | Ca(NO$_3$)$_2$ | Na$_2$SiO$_3$/Na | NaOH | 10 | PKA$_1$A$_2$B | 71.0 | 22.1 |

TABLE 15-continued

Mixed metal salts and anions

| No. | Metal-Salt 1 (M %) | Metal-Salt 2 (M %) | Anion-Comp. 1 (M %) | Anion-Comp. 2 (M %) | Base/Acid (M %) | $\dfrac{\sum_i z_{K,i} * n_{K,i}}{\sum_j z_{S,j} * n_{S,j}}$ | $\dfrac{\sum_l z_{A,l} * n_{A,l}}{\sum_j z_{K,j} * n_{K,j}}$ |
|---|---|---|---|---|---|---|---|
| 76 | 2.3 | 0.7 | 0.5 | 0 | 0.8 | 1.79 | 0.38 |
| 77 | 1.5 | 1.9 | 0.4 | 0 | 1.7 | 2.23 | 0.3 |
| 78 | 1.5 | 1.9 | 0.2 $A_{1+}$ 0.2 $A_1$ | 0 | 1.7 | 2.23 | 0.3 |
| 79 | 1.5 | 1.9 | 0.2 $A_1$ + 0.2 | 0 | 1.7 | 2.23 | 0.3 |
| 80 | 4.4 | 0 | 0.9 | 0.4 | 0.8 | 2.68 | 0.58 |
| 81 | 4.5 | 0 | 0.4 | 0.4 | 0.5 | 2.68 | 0.42 |
| 82 | 4.5 | 0 | 0.4 | 0.5 | 0.6 | 2.68 | 0.42 |
| 83 | 4.5 | 0 | 1.0 | 1.1 | 0.3 | 2.68 | 0.42 |

TABLE 16

Results of the mortar tests, cement: Bemburg CEM I 42.5 R, w/c = 0.42

| | | | Spread (cm) | | | | |
|---|---|---|---|---|---|---|---|
| No. | Polymer | Addition % | 4 min | 10 min | 30 min | 60 min | 90 min | Delta 30 min, cm |
| | P1 | 0.105 | 24.7 | 21.7 | 18.4 | | | |
| 76 | P1 | 0.2 | 23.5 | 22 | 20.8 | 19.9 | | +2.4 |
| 77 | P1 | 0.22 | 23.4 | 27.1 | 28.0 | 27 | 24.9 | +9.6 |
| 78 | P1 | 0.22 | 24.4 | 27.4 | 28.4 | 25.2 | 22.8 | +10.0 |
| 79 | P1 | 0.22 | 28.5 | 27.2 | 26.7 | 25.1 | | +8.3 |
| 80 | P1 | 0.25 | 24.5 | 25.5 | 25.6 | 24.4 | 23.2 | +7.2 |
| 81 | P1 | 0.25 | 24.2 | 28.5 | 28.6 | 26.9 | 25.4 | +10.2 |
| 82 | P1 | 0.25 | 25.0 | 27.5 | 29.1 | 29.4 | 27.3 | +10.7 |
| 83 | P1 | 0.25 | 19.2 | 22.2 | 26 | 26.5 | 25.4 | +7.6 |

TABLE 17

Preparations in powder form

| No. | Polymer | Metal salts | Anion compound | Base/acid | pH | Sequence | Water M % | Polymer (M %) | Metal salt 1 (M %) | Acid (M %) | Anion compound (M %) | Base (M %) | $\dfrac{\sum_i z_{K,i} * n_{K,i}}{\sum_j z_{S,j} * n_{S,j}}$ | $\dfrac{\sum_l TZ_{A,l} * n_{A,l}}{\sum_j z_{K,j} * n_{K,j}}$ |
|---|---|---|---|---|---|---|---|---|---|---|---|---|---|---|
| 84 | P1 | Ca(NH2SO3) | H3PO4 | NaOH | 9.2 | PKAB | 72.0 | 20.9 | | 2.9 | 4.2 | 2.68 | 0.5 |
| 85 | P1 | Ca(NH2SO3) | H3PO4 | NaOH | 10.3 | PKAB | 83.4 | 12.1 | | 1.7 | 2.8 | 1.34 | 0.5 |
| 86 | P1 | Ca(NH2SO3) | H3PO4 | NaOH | 9.6 | PKAB | 84.9 | 12.3 | | 0.9 | 1.9 | 1.34 | 0.25 |
| 87 | P1 | Ca(NH2SO3) | H3PO4 | NaOH | 9.6 | PKAB | 86.8 | 8.4 | | 1.8 | 3.0 | 0.89 | 0.75 |
| 88 | P1 | Ca(OH)2 | H3PO4 | NaOH | 9.35 | PK1SAB | 81.9 | 3.8 | 9.7[1] | 1.7 | 2.9 | 1.34 | 0.5 |
| 89 | P1 | Ca(OH)2 | H3PO4 | NaOH | | | 85.9 | 4.0 | 4.9[2] | 1.8 | 3.5 | 1.34 | 0.5 |
| 90 | P1 | Ca(OH)2 | H3PO4 | NaOH | 9.40 | PKSAB | 69.9 | 6.5 | 16.6 | 2.9 | 4.1 | 2.68 | 0.5 |

[1] Amidosulphonic acid
[2] Formic acid

The mortars were produced in accordance with DIN EN 196-1:2005 in a mortar mixer with a capacity of approximately 5 liters. For mixing up, water and cement were placed into the mixing vessel. Immediately thereafter the mixing operation was commenced, with the fluidizer at a low speed (140 revolutions/min). After 30 seconds, the sand was added at a uniform rate over the course of 30 seconds to the mixture. The mixer was then switched to a higher speed (285 revolutions/min) and mixing was continued for 30 seconds more. After that the mixer was held on for 90 seconds. During the first 30 seconds, the mortar, which stuck to the wall and to the lower part of the bowl, was removed with a rubber scraper and put into the middle of the bowl. After the wait, the mortar was mixed for a further 60 seconds at the higher mixing speed. The total mixing time was 4 minutes.

Immediately after the end of the mixing operation, on all the mortars, the slump flow was determined using the Hägermann comb, with no compaction energy being supplied, in accordance with the SVB guidelines of the Deutscher Ausschuss für Stahlbeton (German reinforced concrete committee). The Hägermann comb (dtop=70 mm, dbottom=100 mm, h=60 mm) was placed centrally on a dry glass plate having a diameter of 400 mm and was filled with mortar up to the level intended. Immediately after levelling had taken place or 5 minutes after the first contact between cement and water, the Hägermann comb was taken off, held over the slumping mortar for 30 seconds to allow for dripping, and then removed. As soon as the slump flow came to a standstill, the diameter was determined, using a caliper gauge, at two axes lying at right angles to one another, and the average was calculated. A spreading board with a diameter of 40 cm was used.

If the polymer is added in the form of a liquid preparation, it is added to the mixing water before the mortar is mixed with water. If the polymer is added in the form of a powder, then the polymer powder is mixed with the cement before the mixing water is added.

TABLE 18

Powder tested in Milke CEM I 52.5N mortar, w/c 0.35, s/c 1.5, adjusted to initial spread of 28 cm

| No. | Form | Polymer | Addition % | Spread (cm) 4 min | 10 min | 30 min | 60 min | 120 min | Delta 120 min, cm |
|---|---|---|---|---|---|---|---|---|---|
|  |  | P1 liquid | 0.145 | 28.5 | 27.0 | 21.2 | 18.9 | 16.5 |  |
| 84 | Powder | P1 | 0.26 | 21.4 | 22.8 | 22.5 | 25.4 | 27.8 | +11.3 |
| 85 | Powder | P1 | 0.22 | 27.3 | 27.5 | 25.6 | 26.8 | 27.5 | +11.0 |
| 86 | Powder | P1 | 0.18 | 28.6 | 27.6 | 22.8 | 21.7 | 19.8 | +3.3 |
| 87 | Powder | P1 | 0.19 | 27.4 | 25.9 | 20.8 | 20.1 | 19.7 | +3.2 |
| 88 | Powder | P1 | 0.23 | 28.5 | 29.2 | 26.3 | 28.2 | 28.8 | +12.3 |
| 90 | Powder | P1 | 0.31 | 27.1 | 28.9 | 28.4 | 31.6 | 33.4 | +16.9 |
| 73 | Liquid | P1 | 0.32 | 28.0 | 30.9 | 31.3 | 38.0 | 36.5 | +20.0 |
| 89 | Powder | P1 | 0.21 | 28.3 | 28.3 | 26.1 | 27.1 | 27.9 | +11.4 |
| 66 | Liquid | P6 | 0.28 | 27.9 | 29.1 | 25.6 | 27.3 | 27.9 | +11.4 |
| 68 | Liquid | P6 | 0.34 | 28.6 | 30.1 | 28.4 | 30.9 | 31.7 | +15.2 |
| 67 | Liquid | P6 | 0.37 | 27.9 | 30.3 | 28.0 | 30.0 | 30.8 | +14.3 |
| 69 | Liquid | P6 | 0.29 | 27.1 | 28.1 | 22.8 | 22.5 | 23.4 | +6.9 |

The invention claimed is:

1. Additive for hydraulically setting compositions, comprising an aqueous, colloidally disperse preparation of at least one salt of a polyvalent metal cation and of at least one polymeric dispersant which comprises anionic and/or anionogenic groups and polyether side chains, where the polyvalent metal cation is selected from $Al^{3+}$, $Fe^{3+}$, $Fe^{2+}$, $Zn^{2+}$, $Mn^{2+}$, $Cu^{2+}$, $Mg^{2+}$, $Ca^{2+}$, $Sr^{2+}$, $Ba^{2+}$ and mixtures thereof, and where the metal cation is present in a quantity such that the following ratio (a) is greater than 1 and less than 30:

$$1 < \frac{\Sigma_i z_{K,i} * n_{K,i}}{\Sigma_j z_{S,j} * n_{S,j}} < 30 \quad (a)$$

where $z_{K,i}$ is the amount of the charge number of the polyvalent metal cation, $n_{K,i}$ is the number of mols of weighed-in polyvalent metal cation, $z_{S,j}$ is the amount of the charge number of the anionic and anionogenic groups present in the polymeric dispersant, $n_{S,j}$ is the number of mols of the anionic and anionogenic groups present in weighed-in polymeric dispersant, the indices i and j are independent of one another and are an integer greater than 0, where i is the number of different kinds of polyvalent metal cations and j is the number of different kinds of anionic and anionogenic groups present in the polymeric dispersant.

2. The additive according to claim 1, comprising at least one anion which is able to form a low-solubility salt with at least one of the polyvalent metal cations.

3. The additive according to claim 1, where at least one polyvalent metal cation and at least one anion are present in an amount calculated according to the following formulae:

$$1 < \frac{\Sigma_i z_{K,i} * n_{K,i}}{\Sigma_j z_{S,j} * n_{S,j}} < 30 \quad (a)$$

$$0 \leq \frac{\Sigma_l z_{A,l} * n_{A,l}}{\Sigma_i z_{K,i} * n_{K,i}} < 3 \quad (b)$$

where $z_{K,i}$ is the amount of the charge number of the polyvalent metal cation, $n_{K,i}$ is the number of mols of the weighed-in polyvalent metal cation, $z_{S,j}$ is the charge number of the anionic and anionogenic groups present in the polymeric dispersant, $n_{S,j}$ is the number of mols of the anionic and anionogenic groups present in the weighed-in polymeric dispersant, $z_{A,l}$ is the charge number of weighed-in anion, $n_{A,l}$ is the number of mols of the weighed-in anion, the indices i, j and l are independent of one another and are an integer greater than 0, i is the number of different kinds of polyvalent metal cations and j is the number of different kinds of anionic and anionogenic groups present in the polymeric dispersant, and l is the number of different kinds of anions which are able to form a low-solubility salt with the metal cation.

4. The additive according to claim 2, where the anion is selected from carbonate, oxalate, silicate, phosphate, polyphosphate, phosphite, borate, aluminate and sulphate.

5. The additive according to claim 1, further comprising at least one neutralizing agent.

6. The additive according to claim 5, where the neutralizing agent is an organic monoamine, polyamine, ammonia or an alkali metal hydroxide.

7. The additive according to claim 1, having a pH of 2 to 11.5.

8. The additive according to claim 1, where the polymeric dispersant comprises as anionic or anionogenic group at least one structural unit of the general formulae (Ia), (Ib), (Ic) and/or (Id):

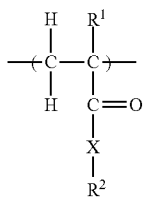
(Ia)

in which
R¹ is H or an unbranched or branched $C_1$-$C_4$ alkyl group or $CH_2CO$—X—$R^2$;
X is NH—$(C_nH_{2n})$ or O—$(C_nH_{2n})$ with n=1, 2, 3 or 4, or is a chemical bond, where the nitrogen atom or the oxygen atom is bonded to the CO group;
$R^2$ is OM, $PO_3M_2$, or O—$PO_3M_2$; with the proviso that X is a chemical bond if $R^2$ is OM;

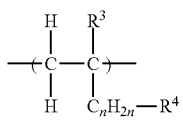
(Ib)

in which
$R^3$ is H or an unbranched or branched $C_1$-$C_4$ alkyl group;
n is 0, 1, 2, 3 or 4;
$R^4$ is $PO_3M_2$, or O—$PO_3M_2$;

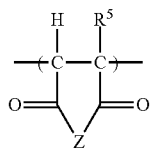
(Ic)

in which
$R^5$ is H or an unbranched or branched $C_1$-$C_4$ alkyl group;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and n is 1, 2, 3 or 4;

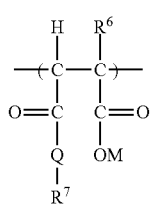
(Id)

in which
$R^6$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and n is 1, 2, 3 or 4; and
where each M independently of any other is H or a cation equivalent.

9. The additive for hydraulically setting compositions according to claim 1, where the polymeric dispersant comprises as polyether side chain at least one structural unit of the general formulae (IIa), (IIb), (IIc) and/or (IId):

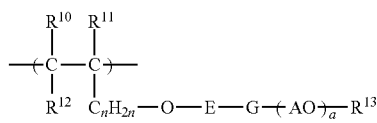
(IIa)

in which
$R^{10}$, $R^{11}$ and $R^{12}$ independently of one another are H or an unbranched or branched $C_1$-$C_4$ alkyl group;
E is an unbranched or branched $C_1$-$C_6$ alkylene group, a cyclohexylene group, $CH_2$-$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5, or is $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, CO—$NH_2$ and/or $COCH_3$;

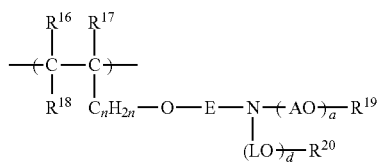
(IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;
A is $C_xH_{2x}$ with x=2, 3, 4 or 5, or is $CH_2CH(C_6H_5)$;
n is 0, 1, 2, 3, 4 and/or 5;
L is $C_xH_{2x}$ with x=2, 3, 4 or 5, or is $CH_2$—$CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched or branched $C_1$-$C_4$ alkyl group; and
n is 0, 1, 2, 3, 4 or 5;

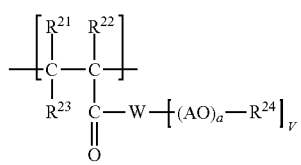
(IIc)

in which
$R^{21}$, $R^{22}$ and $R^{23}$ independently of one another are H or an unbranched or branched $C_1$-$C_4$ alkyl group;
W is O, $NR^{25}$, or is N;
V is 1 if W=O or $NR^{25}$, and is 2 if W=N;
A is $C_xH_{2x}$ with x=2, 3, 4 or 5, or is $CH_2CH(C_6H_5)$;
a is an integer from 2 to 350;

$R^{24}$ is H or an unbranched or branched $C_1$-$C_4$ alkyl group;
$R^{25}$ is H or an unbranched or branched $C_1$-$C_4$ alkyl group;

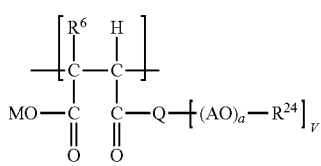

(IId)

in which
$R^6$ is H or an unbranched or branched $C_1$-$C_4$ alkyl group;
Q is $NR^{10}$, N or O;
V is 1 if Q=O or $NR^{10}$ and is 2 if Q=N;
$R^{10}$ is H or an unbranched or branched $C_1$-$C_4$ alkyl group;
A is $C_xH_{2x}$ with x=2, 3, 4 or 5, or is $CH_2C(C_6H_5)H$; and
a is an integer from 2 to 350.

10. The additive for hydraulically setting compositions according claim 1, where the polymeric dispersant is a polycondensation product comprising structural units (III) and (IV):

(III)

in which
T is a substituted or unsubstituted phenyl or naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is $C_xH_{2x}$ with x=2, 3, 4 or 5, or is $CH_2CH(C_6H_5)$;
a is an integer from 1 to 300;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb):

(IVa)

in which
D is a substituted or unsubstituted phenyl or naphthyl radical or a substituted or unsubstituted heteroaromatic radical having 5 to 10 ring atoms, of which 1 or 2 atoms are heteroatoms selected from N, O and S;
E is N, NH or O, with the proviso that m is 2 if E is N and with the proviso that m is 1 if E is NH or O;
A is $C_xH_{2x}$ with x=2, 3, 4 or 5, or is $CH_2CH(C_6H_5)$;
b is an integer from 1 to 300;

M independently at each occurrence is H or a cation equivalent;

(IVb)

in which
V is a substituted or unsubstituted phenyl or naphthyl radical and is optionally substituted by 1 or two radicals selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is H or a cation equivalent; and
$R^8$ is $C_1$-$C_4$ alkyl, phenyl, naphthyl, phenyl-$C_1$-$C_4$ alkyl or $C_1$-$C_4$ alkylphenyl.

11. The additive according to claim 1, obtained by precipitating the salt of the polyvalent metal cation in the presence of the polymeric dispersant, to give a colloidally disperse preparation of the salt, or obtained by dispersing a freshly precipitated salt of the polyvalent metal cation in the presence of the polymeric dispersant, to give a colloidally disperse preparation of the salt.

12. The additive for hydraulically setting compositions according to claim 11, where a neutralizing agent is added to the colloidally disperse preparation.

13. The additive for hydraulically setting compositions according to claim 1, obtained by peptizing a hydroxide and/or oxide of the polyvalent metal cation with an acid, to give a colloidally disperse preparation of the salt of the polyvalent metal cation, where the acid is optionally selected from boric acid, carbonic acid, oxalic acid, silicic acid, polyphosphoric acid, sulphuric acid, phosphoric acid and/or phosphorous acid.

14. Process for preparing the additive for hydraulically setting compositions according to claim 1, where the salt of the polyvalent metal cation is precipitated in the presence of the polymeric dispersant, to give a colloidally disperse preparation of the salt, or where a freshly precipitated salt of the polyvalent metal cation is dispersed in the presence of the polymeric dispersant, to give a colloidally disperse preparation of the salt.

15. Method comprising utilizing the additive for hydraulically setting compositions according to claim 1 as a slump retainer in water-containing building material mixtures which comprise a hydraulic binder.

16. The method according to claim 15, where the hydraulic binder is selected from (Portland) cement, slag sand, flyash, silica dust, metakaolin, natural pozzolans, burnt oil shale, calcium aluminate cement and mixtures of two or more of these components.

17. Building material mixture comprising an additive according to claim 1 and a binder selected from (Portland) cement, slag sand, flyash, silica dust, metakaolin, natural pozzolans, burnt oil shale and calcium aluminate cement and mixtures thereof.

* * * * *